(12) United States Patent
Kato

(10) Patent No.: US 7,443,770 B2
(45) Date of Patent: Oct. 28, 2008

(54) APPARATUS FOR PLAYBACK OF DATA STORAGE DISKS

(75) Inventor: Tetsuya Kato, Sayama (JP)

(73) Assignee: Teac Corporation, Tokyo (JP)

( * ) Notice: Subject to any disclaimer, the term of this patent is extended or adjusted under 35 U.S.C. 154(b) by 806 days.

(21) Appl. No.: 10/807,150

(22) Filed: Mar. 23, 2004

(65) Prior Publication Data

US 2004/0179435 A1 Sep. 16, 2004

Related U.S. Application Data

(63) Continuation of application No. PCT/JP02/10042, filed on Sep. 27, 2002.

(30) Foreign Application Priority Data

| Sep. 28, 2001 | (JP) | ............................. 2001-299691 |
| Jan. 25, 2002 | (JP) | ............................. 2002-016691 |

(51) Int. Cl.
*G11B 7/007* (2006.01)
(52) U.S. Cl. .................... 369/30.05; 369/30.04; 369/83
(58) Field of Classification Search ...................... None
See application file for complete search history.

(56) References Cited

U.S. PATENT DOCUMENTS

| 5,724,322 | A | * | 3/1998 | Kondo et al. ............. 369/30.09 |
| 5,949,746 | A | * | 9/1999 | Yamagami et al. ....... 369/47.19 |
| 6,501,901 | B2 | * | 12/2002 | Yasuda et al. .................. 386/52 |
| 7,068,581 | B2 | * | 6/2006 | Katoh et al. ............. 369/59.25 |

FOREIGN PATENT DOCUMENTS

| JP | 02/118984 A | 5/1990 |
| JP | 06/231572 A | 8/1994 |
| JP | 08/138352 A | 5/1996 |
| JP | 09/147531 A | 6/1997 |
| JP | 10/064245 A | 3/1998 |

* cited by examiner

*Primary Examiner*—Joseph Feild
*Assistant Examiner*—Tawfik Goma
(74) *Attorney, Agent, or Firm*—Woodcock Washburn LLP

(57) ABSTRACT

A CD player for use with a CD having prerecorded thereon a series of tunes or tracks together with track numbers, and with a TOC which lists the prerecorded tunes with their starting addresses but, conventionally, with no ending addresses. The CD player comprises a RAM for storing the TOC read on the CD, a CPU for permitting the user to edit the TOC, and a preprogrammed RAM. After being stored on the RAM, the TOC from the disk is modified to include the ending addresses of the prerecorded tunes in addition to their starting addresses. The thus modified TOC is editable by the user for playback of any desired tune or tunes, either in part or in whole and in any desired order, permitting the customization of disk playback in a far more diversified way than heretofore.

10 Claims, 26 Drawing Sheets

Figure 5

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 6

RAM 14

| | |
|---|---|
| First = 1 | — $M_a$ |
| Last = 4 | — $M_b$ |
| Start [0] = 00000000 | — $M_{1a}$ |
| End [0] = 00000500 | — $M_{1b}$ |
| Start [1] = 00000500 | — $M_{2a}$ |
| End [1] = 00001000 | — $M_{2b}$ |
| Start [2] = 00001000 | — $M_{3a}$ |
| End [2] = 00002000 | — $M_{3b}$ |
| Start [3] = 00002000 | — $M_{4a}$ |
| End [3] = 00003000 | — $M_{4b}$ |

Figure 8

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 9

RAM 14

| | |
|---|---|
| First = 1 | — $M_a$ |
| Last = 2 | — $M_b$ |
| Start [0] = 00000000 | — $M_{1a}$ |
| End [0] = 00002000 | — $M_{1b}$ |
| Start [1] = 00002000 | — $M_{2a}$ |
| End [1] = 00003000 | — $M_{2b}$ |

Figure 11   RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 12   RAM 14

| | |
|---|---|
| First = 1 | — $M_a$ |
| Last = 2 | — $M_b$ |
| Start [0] = 00000000 | — $M_{1a}$ |
| End [0] = 00001000 | — $M_{1b}$ |
| Start [1] = 00002000 | — $M_{2a}$ |
| End [1] = 00003000 | — $M_{2b}$ |

Figure 14

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 15

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001200 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 16

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 17

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00001800 | — $M_{2b}$ |
| Start [2] = 00002000 | — $M_{3a}$ |
| End [2] = 00003000 | — $M_{3b}$ |

Figure 19

RAM 14

| First = 1 | — $M_a$ |
|---|---|
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 20

RAM 14

| First = 1 | — $M_a$ |
|---|---|
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00001200 | — $M_{2b}$ |
| Start [2] = 00001200 | — $M_{3a}$ |
| End [2] = 00003000 | — $M_{3b}$ |

Figure 21

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 22

RAM 14

| | |
|---|---|
| First = 1 | — $M_a$ |
| Last = 3 | — $M_b$ |
| Start [0] = 00001000 | — $M_{1a}$ |
| End [0] = 00002000 | — $M_{1b}$ |
| Start [1] = 00000000 | — $M_{2a}$ |
| End [1] = 00001000 | — $M_{2b}$ |
| Start [2] = 00002000 | — $M_{3a}$ |
| End [2] = 00003000 | — $M_{3b}$ |

Figure 23

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00001000 | — $M_{2a}$ |
| End [1] = 00002000 | — $M_{2b}$ |
| Start [2] = 00002000 | — $M_{3a}$ |
| End [2] = 00003000 | — $M_{3b}$ |

Figure 24

RAM 14

| | |
|---|---|
| First = 1 | — $M_a$ |
| Last = 3 | — $M_b$ |
| Start [0] = 00000000 | — $M_{1a}$ |
| End [0] = 00001000 | — $M_{1b}$ |
| Start [1] = 00002000 | — $M_{2a}$ |
| End [1] = 00003000 | — $M_{2b}$ |
| Start [2] = 00001000 | — $M_{3a}$ |
| End [2] = 00002000 | — $M_{3b}$ |

Figure 27

RAM 14

| | |
|---|---|
| First = 1 | $M_a$ |
| Last = 5 | $M_b$ |
| Start [0] = 00000000 | $M_{1a}$ |
| End [0] = 00001000 | $M_{1b}$ |
| Start [1] = 00001000 | $M_{2a}$ |
| End [1] = 00002000 | $M_{2b}$ |
| Start [2] = 00002500 | $M_{3a}$ |
| End [2] = 00003000 | $M_{3b}$ |
| Start [3] = 00004000 | $M_{4a}$ |
| End [3] = 00005000 | $M_{4b}$ |
| Start [4] = 00003000 | $M_{5a}$ |
| End [4] = 00004000 | $M_{5b}$ |

Figure 28

1. *Stno* = 1, *Etno* = 2
   Play from *STAD* = 00000000 to *EDAD* = 00002000

2. *Stno* = 3, *Etno* = 3
   Play from *STAD* = 00002500 to *EDAD* = 00003000

3. *Stno* = 4, *Etno* = 4
   Play from *STAD* = 00004000 to *EDAD* = 00005000

4. *Stno* = 5, *Etno* = 5
   Play from *STAD* = 00003000 to *EDAD* = 00004000

APPARATUS FOR PLAYBACK OF DATA STORAGE DISKS

RELATED APPLICATIONS

This is a continuation of International Application No. PCT/JP02/10042 filed Sep. 27, 2002, which claims priority to Japanese Patent Application No. 2002-016691 filed Jan. 25, 2002, which is a continuation of Japanese Patent Application No. 2001-299691 filed Sep. 28, 2001, and for which priority also has been claimed.

FIELD OF THE INVENTION

This invention relates to an apparatus for playing data storage disks such for example as compact disks (CDs) each having a plurality of tunes prerecorded thereon in succession.

BACKGROUND OF THE INVENTION

The music CD in general bears a table of contents (TOC) listing the tunes prerecorded thereon and the addresses of the locations in which they start. The prerecorded tunes are usually referred to as tracks according to common CD parlance, and the serial numbers assigned to the tunes as track numbers. These familiar CD terms, "tracks" and "track numbers," will be used in some cases in places of prerecorded tunes and their serial numbers hereinafter in this specification. The track number must be specified for playback of any desired one of the tracks on the CD. The starting address of any specified track is ascertainable from the TOC, enabling the optical pickup to be positioned at the beginning of that track for immediate commencement of playback. Two or more different desired track numbers may be input in a desired sequence for sequential playback of the desired tunes.

The TOC of the CD commercially available today lists only the starting address of each recorded tune. The existing TOC has therefore not enabled the user to choose some desired part of each tune for playback or for rerecording on different media such as recordable CDs (CD-Rs), re-writable CDs (CD-RWs), so-called minidisks (MDs), or digital audio tapes (DATs). Of course, the user may manually play back only part of each tune, but difficulties have been involved in playing back the exactly desired part of the tune. It has not been possible, either, to divide each track into two or more parts, to join two or more tracks, to skip or move a track or tracks, or to otherwise edit the prerecorded tunes, by making use of the TOC.

It has been suggested to incorporate into the CD player an additional memory dedicated to partial playback of any desired part of each tune. The user is to write on the memory what part of which tune he or she desires to be played back. This additional memory has to be of in-conveniently large capacity for storing all the pertinent data of the recordings.

The TOC on magneto-optic MDs bear the addresses of both beginning and end of each tune recorded thereon, as disclosed for example in Japanese Unexamined Patent Publications Nos. 6-231572 and 8-138352. The editing of the TOC on MDs is therefore far easier than that on music CDs, there being no ending address of the tunes being listed as aforesaid on the TOC of CDs. Hitherto, therefore, no editing of the TOC has been practiced in the case of CDs.

The present invention has it as an object to provide an apparatus for playback of a data storage disk of the type having a series of tunes or like information streams prerecorded thereon, so made that the information streams may be played back in a more versatile way than heretofore.

SUMMARY OF THE INVENTION

The disk playback apparatus according to the invention is for use with a data storage disk of the type having a series of data streams and a TOC prerecorded in preassigned tracks thereon. Each data stream is comprised of a series of frames each having a data region for storage of data and an address region for storage of the address of the frame in question in the track in question. The TOC on the disk conventionally lists the starting addresses of the data streams.

The playback apparatus according to the invention comprises: (a) a transducer for reading the prerecorded data streams and TOC on the disk by relatively scanning the tracks thereon; (b) storage means connected to the transducer for rewritably storing the TOC read on the disk by the transducer; and (c) data processing means connected to the transducer for creating a modified or expanded TOC by adding the ending address of each data stream to the original TOC that has been recovered from the disk and stored on the storage means, and for controlling the scanning motion of the transducer with respect to the disk by use of the expanded TOC so as to play either whole or some desired part of any desired one of the data streams.

The term "starting address" as used herein and in the claims appended hereto means the address data uniquely indicating the position on the disk where each data stream begins. The term "ending address" like-wise means the address data uniquely indicating the position on the disk where each data stream terminates.

The noted data processing means may comprise: (a) input means for inputting instructions for editing the TOC that has been stored on the storage means; (b) ending address addition means connected to the storage means for writing on the storage means, as the ending address of each data stream, the starting address of the next data stream; (c) editing means connected to the input means and the storage means for creating the expanded TOC by editing, in response to the instructions that have been input on the input means, the original TOC to which there have been added the ending addresses, and for storing the resulting expanded table of contents on the storage means; and (d) control means connected to the storage means for causing either whole or part of each data stream to be played.

The noted ending address addition means, editing means, and control means may be comprised of a central processor unit (CPU) connected to the input means, and a memory connected to the CPU and storing a pro-gram for addition of the ending addresses and a program for editing the TOC following the addition of the ending addresses.

The noted data processing means may comprise: (a) means for specifying any desired address intermediate the starting address and ending address of any desired one of the prerecorded data streams in order to divide the desired data stream into parts upstream and downstream, respectively, of the desired intermediate address; and (b) means for introducing into the TOC on the storage means the desired intermediate address both as the ending address of the upstream division of the desired data stream and as the starting address of the downstream division of the desired data stream, and for further introducing into the TOC on the storage means the ending address of the desired data stream as the ending address of the downstream division of the desired data stream.

In order to enable the user to sequentially play back two or more selected ones of the prerecorded data streams on the disk, the noted data processing means may comprise means for storing on the TOC on the storage means the starting address of the most upstream one of the selected data streams as the starting address of the selected series of data streams, and for storing on the TOC on the storage means the ending address of the most downstream one of the selected data streams as the ending stream of the selected series of data streams.

In order to inhibit the playback of any selected one of the prerecorded data streams on the disk, the noted data processing means may comprise means for erasing from the TOC the starting and ending ad-dresses of the selected data stream.

In order to inhibit the playback of part of any selected one of the prerecorded data streams on the disk, the noted data processing means may comprise means for changing at least either of the starting and ending addresses of the selected data stream on the TOC on the storage means.

In order to enable the sequential playback of any selected first one of the prerecorded data streams on the disk and a second one that is immediately downstream of the first selected data stream, with a change in the point of transition between the two, the noted data processing means may comprise means for specifying a desired address intermediate the starting and ending addresses of the second data stream, and means for storing the desired intermediate address on the TOC on the storage means as the ending address of the first selected data stream and as the starting address of the second data stream.

In order to enable the sequential playback of any selected first one of the prerecorded data streams on the disk and a second one that is immediately downstream of the first selected data stream, with a change in the point of transition between the two, the noted data processing means may comprise means for specifying a desired address intermediate the starting and ending addresses of the first data stream, and means for storing the de-sired intermediate address on the TOC on the storage means as the ending address of the first selected data stream and as the starting address of the second data stream.

In order to enable the sequential playback of any selected two of the prerecorded data streams on the disk, with a change in the sequence of playback, the noted data processing means may comprise means for storing, as the starting and ending addresses of the first selected data stream, the starting and ending addresses of the second selected data stream on the TOC on the storage means, and, as the starting and ending addresses of the second selected data stream, the starting and ending addresses of the first selected data stream on the TOC on the storage means.

A preferred form of the data storage disk is a CD.

Preferably, the starting and ending addresses set forth in the foregoing summary are the absolute addresses of the CD.

Preferably, the ending address of each data stream is the starting address of the next data stream.

The playback apparatus according to the invention comprises storage means for storing a rewritable TOC that has been read for the disk with which the apparatus is being put to use, together with means for adding to the stored TOC the ending addresses of the tunes or like information streams prerecorded on the disk. Thus the original TOC that is customarily prerecorded on any commercial music CD, which lists no ending addresses of the tunes, may be readily modified into the TOC required by the instant invention, specifying both starting and ending addresses of each tune. The thus modified table of contents enables the user to divide, join, skip, move, or otherwise edit the prerecorded information streams and hence to customize the playback of the information streams in a far more variegated fashion than heretofore.

BRIEF DESCRIPTION OF THE DRAWINGS

FIG. 5 is a diagram of a three-track expanded TOC before being edited for dividing a track on the CD.

FIG. 6 is a diagram similar to FIG. 5 but showing the expanded TOC after being edited for dividing one of the tracks.

FIG. 8 is a diagram of a three-track expanded TOC before being edited for joining tracks.

FIG. 9 is a diagram similar to FIG. 8 but showing the expanded TOC after being edited into a two-track TOC by joining two of the original three tracks.

FIG. 11 is a diagram of a three-track expanded TOC before being edited for skipping tracks.

FIG. 12 is a diagram similar to FIG. 11 but showing the expanded TOC after being edited into a two-track TOC by skipping one of the tracks.

FIG. 14 is a diagram of a three-track expanded TOC before being edited for starting the playback of any desired track from any desired be-ginning.

FIG. 15 is a diagram similar to FIG. 14 but showing the expanded TOC after being edited for moving the beginning of one of the tracks.

FIG. 16 is a diagram of a three-track expanded TOC before being edited for terminating the playback of any desired track at an arbitrary end other than its true end.

FIG. 17 is a diagram similar to FIG. 16 but showing the expanded TOC after being edited for moving the end of one of the tracks.

FIG. 19 is a diagram of a three-track expanded TOC before being edited for moving part of a desired track.

FIG. 20 is a diagram similar to FIG. 19 but showing the expanded TOC after being edited for moving part of one track and joining the part to the next track.

FIG. 21 is a diagram of a three-track expanded TOC before being edited for track rearrangement.

FIG. 22 is a diagram similar to FIG. 21 but showing the expanded TOC after being edited for track rearrangement.

FIG. 23 is a diagram of a three-track expanded TOC before being edited for another example of track rearrangement.

FIG. 24 is a diagram similar to FIG. 23 but showing the expanded TOC after being edited for the other example of track rearrangement.

FIG. 27 is a diagram of a five-track expanded TOC, the diagram being explanatory of some "continuous" tracks in the TOC.

FIG. 28 is a diagram explanatory of how the "continuous" tracks in the FIG. 27 TOC are put to unbroken playback.

DETAILED DESCRIPTION OF ILLUSTRATIVE EMBODIMENTS

Figure 1:
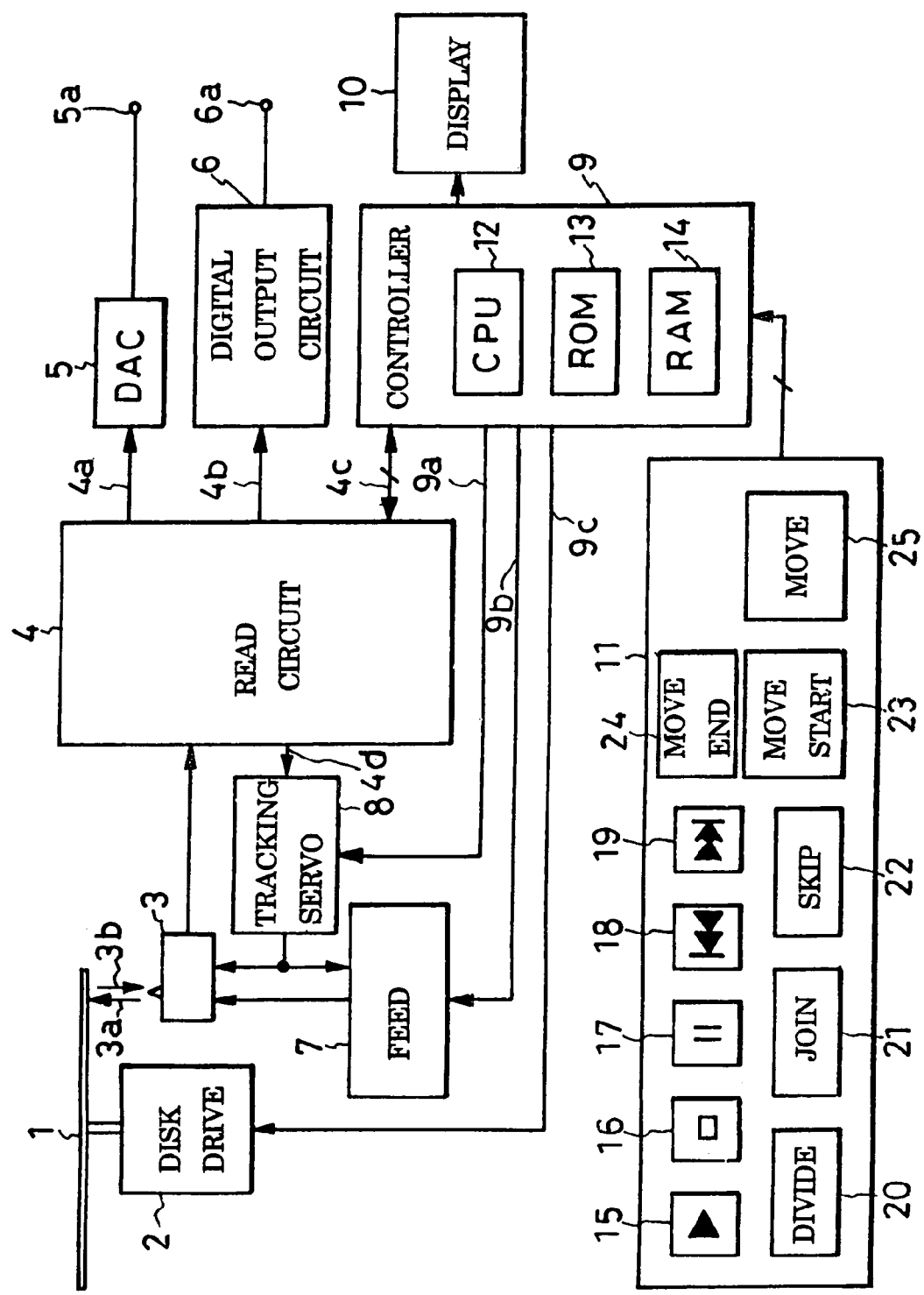
FIG. 1 is a block diagram of a CD or like disk player embodying the principles of the instant invention.

The disk player of FIG. 1, embodying the principle of this invention, is for use with a commercially available music CD or like disk 1 for the playback of the tunes prerecorded thereon. Broadly, the disk player comprises a known disk drive mechanism 2, a known optical pickup or head or transducer 3, a known read circuit 4, a known digital-to-analog converter (DAC) 5, a known digital output circuit 6, a known feed mechanism 7, a known tracking servo circuit 8, a controller 9 including both known playback control means and additional control means that are needed for the practice of this invention, a known display 10, and input means 11 constituted of both prior art and inventive means, in addition to the focusing servo and various other means that are not shown because of their well known and conventional nature.

[The commercial music CD has a series of tunes, each with subcode and other control data, and a TOC prerecorded along a multiturn spiral track thereon. The illustrated disk player may be put to use with not only the commercially available prerecorded CD but also the CD-R or CD-RW that has been recorded by CD-R or CD-RW drives, as long as the data arrangement thereon is similar to that of the CD. As is standard in the art, the commercial CD has a program section on which the tunes are recorded, a lead-in section preceding the program section, and a lead-out section following the program section, as set forth in more detail in the following.

Figure 3:
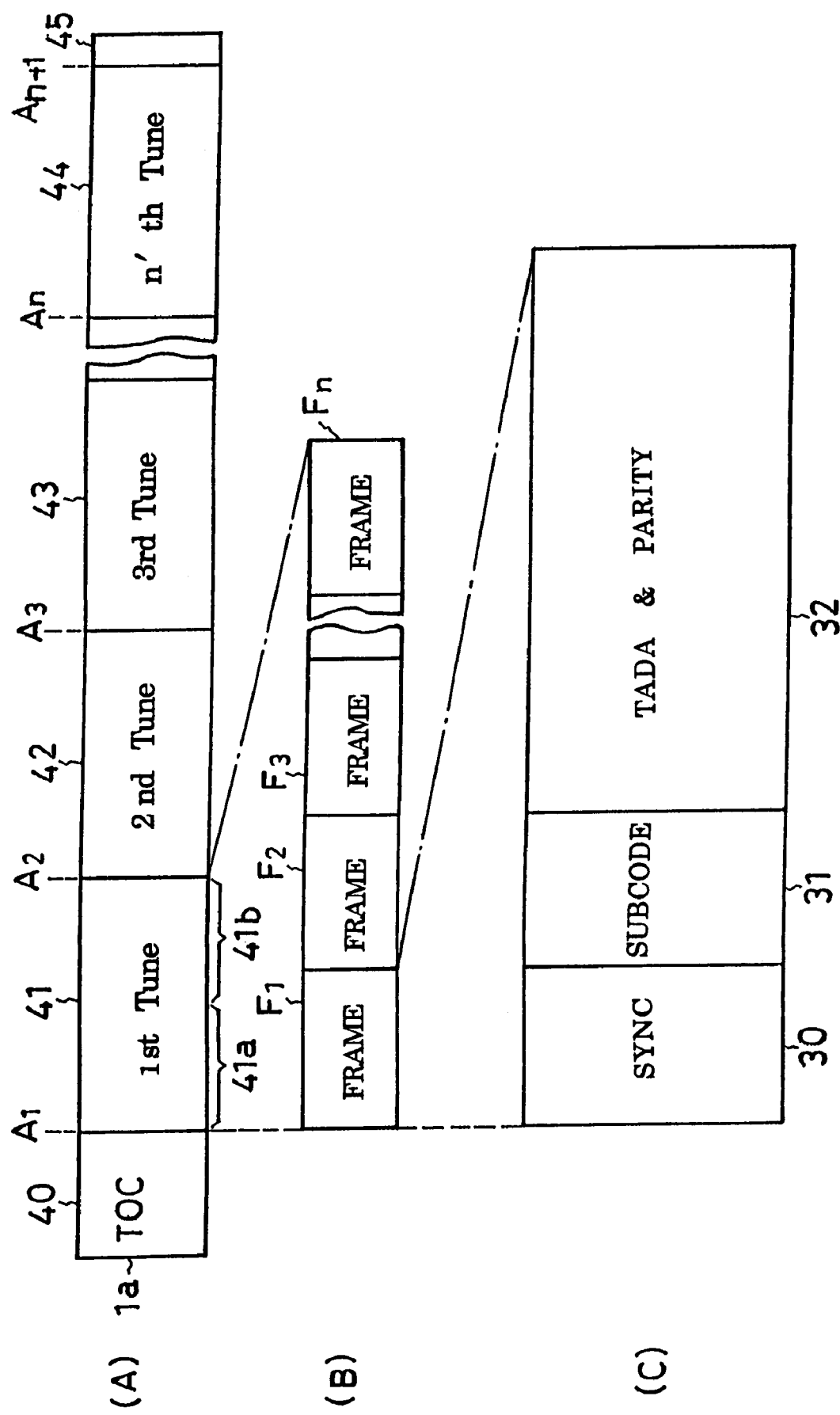
FIG. 3 is a series of diagrams explanatory of the arrangement of the prerecorded TOC and series of tunes on the CD for use with the FIG. 1 disk player, of the frames constituting each tune, and of the format of each frame.

FIG. 3 is a schematic, fragmentary illustration of data arrangement along the track $1_a$ on the CD. The track $1_a$ is shown at (A) in this figure to have a lead-in section 40 on which is recorded the TOC, a program or main data section which immediately follows the lead-in section 40 and which is subdivided into a series of subsections 41-44 having first to n'th tunes prerecorded respectively thereon, and a lead-out section 45 immediately following the n'th tune subsection 44. The lead-in section 40 constitutes Track 00. The indicia $A_1$, $A_2$, $A_3$, $A_{n+1}$ in FIG. 3 stand for the starting addresses of the first to n'th main data subsections 41-44 and lead-out section 45, respectively.

The TOC on the lead-in section 40 of the disk 1 includes the following information:
1. The first track or tune number on the disk.
2. The last track or tune number on the disk.
3. The starting address, in terms of absolute time, of each track on the disk, with a clear connection between each starting address and the corresponding track or the code identificatory of the tune.
4. The starting address, in terms of absolute time, of the lead-out section.

Use of the TOC has conventionally enabled the user to program the tunes he or she wishes to listen to. He or she may input the track numbers of the desired tunes. Since the starting addresses of all these desired tunes are listed in the TOC, the optical pickup 3 will be automatically positioned at the beginnings of the successive desired tunes for playback. It has so far been impossible, however, to program the playback of some desired part of each tune, either from the beginning to some intermediate point, or from some intermediate point toward the end. The present invention has over-come this inconvenience by devising the expanded TOC to be detailed subsequently.

As indicated at (B) in FIG. 3, each of the main data subsections 41-44 consists of a series of frames $F_1, F_2, F_3, \ldots F_n$. Each of these frames $F_1$-$F_n$ is formatted as at (C) in FIG. 3, having a synchronization area 30, subcode area 31, and data and parity area 32. The tune and parity data are recorded on the data and parity area 32. The subcode area 31 contains the following information:
1. Audio information or tune properties such as preemphasis, copy-right, and data properties.
2. Track numbers (lead-in section, 00 ; program subsections, 01-99; lead-out section, AA).
3. Index numbers (00-99).
4. Lapse of time during playback of each track or tune, in minutes, seconds and frames.
5. Absolute time on the disk, in minutes, seconds and frames.

Up to ninety-nine track numbers, from Track 01 to Track 99, are to be assigned one to each of as many prerecorded tunes on the CD to uniquely identify each tune. Track 00 is assigned as aforesaid to the lead-in section, and no track number to the lead-out section. The index numbers, also from 00 to 99, are assigned one to each subdivision of each tune. The lapse of time during playback of each tune is expressed in minutes, seconds and frames. Absolute time on the disk is expressed cumulatively from the beginning of the first tune in minutes, seconds and frames and thus serves as address for each frame.

The disk drive mechanism 2 imparts rotation to the disk 1. A signal path $9c$ connects the controller 9 to the drive mechanism 2, enabling the former to control the latter for disk rotation at the required speed.

The optical pickup 3 is of the familiar make capable of emitting a beam of light $3_a$ through a movable objective lens and receiving the reflection $3_b$ of the beam. Since the light beam $3_a$ is modulated by the pits in the surface of the disk 1 on hitting the disk surface, the pickup 3 provides an electric read signal carrying the tune and subcode data as well as the TOC, tracking and focusing information.

Connected to the pickup 3 via a signal path $3_c$, the read circuit 4 conventionally comprises an amplifier circuit, means for EFM data demodulation, means for error detection and correction, means for tracking data extraction, means for focusing data extraction, means for subcode data extraction, and so forth.

The read circuit 4 has an output connected by way of a signal path 4a to the DAC 5. The digital signal representative of the tunes read on the disk 1 is translated by this DAC 5 into an analog audio signal, for delivery to the analog output 5$_a$.

The read circuit 4 has another output connected by way of a signal path 4$_b$ to a digital output circuit 6. The digital audio signal together with the subcode from the read circuit 4 is reformatted for delivery to external digital recorders designed for use with such media as MDs, CD-Rs, CD-RWs and DATs or to loudspeaker systems capable of directly inputting the digital audio signal. Any such external device may be coupled to the digital output 6$_a$ for directly inputting the digital audio signal.

Electrically connected to the controller 9 via the signal path 9$_b$ and mechanically coupled to the pickup 3, the feed mechanism 7 operates under the direction of the controller for moving the pickup across the track turns on the disk to any desired track position thereon. The feed mechanism 7 in combination with the tracking servo constitutes means for positioning the pickup 3, or the light beam 3$_a$ emitted thereby, with respect to the disk 1.

The tracking servo circuit 8 has an input connected to the read circuit 4 via the signal path 4$_d$, and another input connected to the controller 9 via the signal path 9$_b$. Inputting the tracking information from the read circuit 4, the tracking servo circuit 8 conventionally functions to keep the beam 3$_a$ in centerline alignment with the track on the disk 1. The controller 9 delivers the familiar jumping signal to the tracking servo circuit 8 for causing the beam 3$_a$ to jump radially of the disk 1.

The unshown focusing servo, not shown, responds to the focusing information supplied from the read circuit 3. The noted objective lens built into the pickup 3 is adjustably moved by the focusing servo toward and away from the disk surface in order to keep the beam 3$_a$ focused thereon.

The controller 9 is connected to the read circuit 4 via the signal path 4$_c$. Generally taking the form of a microprocessor, the controller 9 comprises a central processor unit (CPU) 12, a preprogrammed read-only memory (ROM) 13, and a random-access memory (RAM) 14, together with busses interconnecting them. Among the intended functions of this controller 9 are:

1. To retrieve a desired tune or tunes from the disk 1 for delivery either to the analog output 5$_a$ or digital output 6$_a$.
2. To retrieve the TOC data from Track 00 on the disk 1 for storage on the RAM 14.
3. To create the ending addresses of the tunes listed on the disk TOC and add them to the retrieved original TOC data for provision of the expanded TOC on the RAM 14.
4. To edit the expanded TOC on the RAM 14.
5. To cause the desired tune or tunes to be played back in conformity with the expanded and edited TOC.

Figure 2:
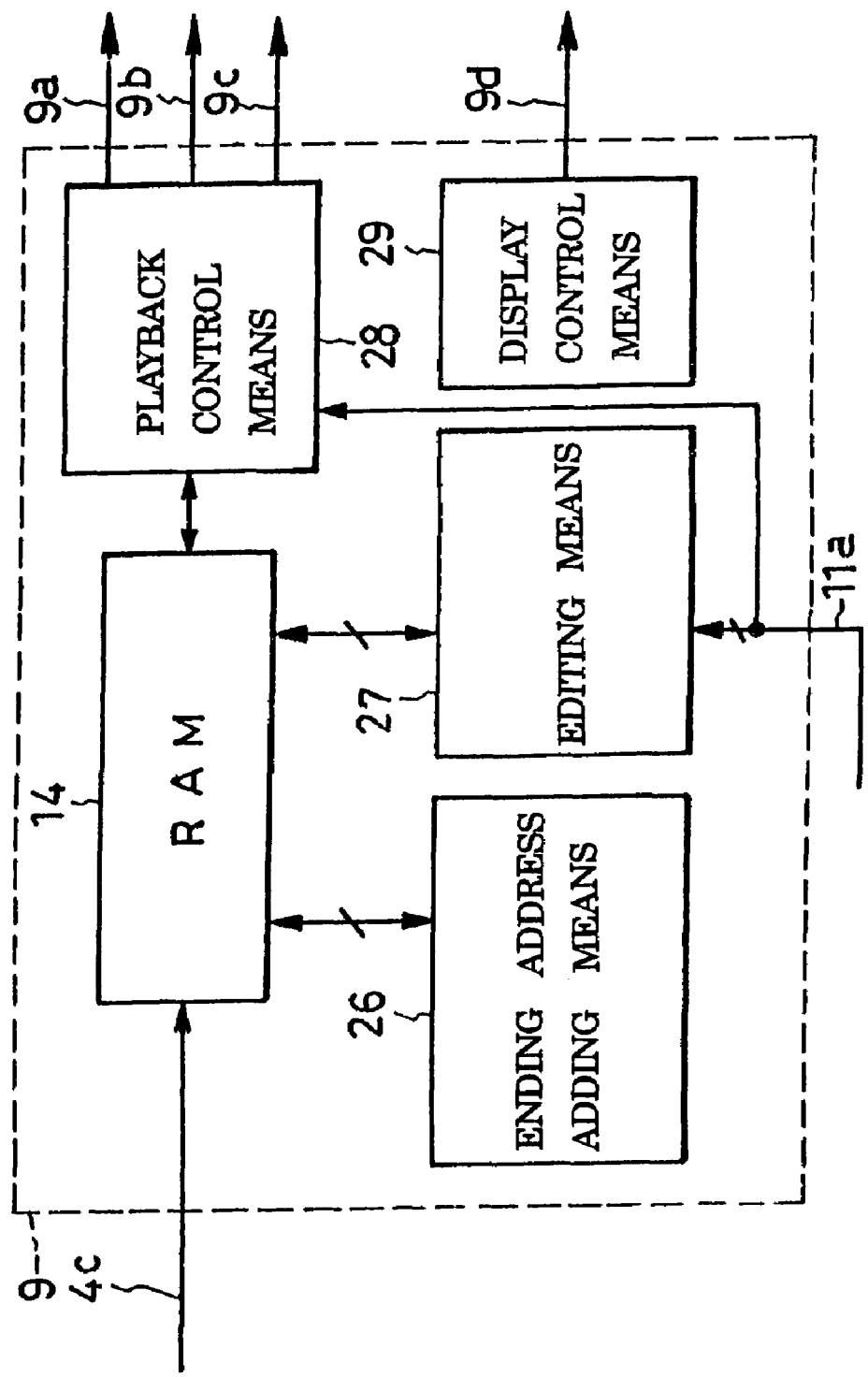
FIG. 2 is a block diagram equivalently or functionally illustrating the controller of the FIG. 1 disk player in more detail.

The controller 9 will be better understood by referring to its equivalent circuit diagram given as FIG. 2. The controller 9 is herein shown as equivalently comprising, in addition to the RAM 14 connected to the signal path 4, for rewritably storing the TOC, means 26 for creation of the expanded TOC on the RAM by addition of the ending addresses of the prerecorded tunes, means 27 for editing the expanded TOC, means 28 for controlling playback according to the expanded and edited TOC, and means 29 for controlling the display 10. The ending address adding means 26, editing means 27, playback control means 28, and display control means 29 are constituted of the CPU 12 and ROM 13, FIG. 1. The ROM 13 stores all the programs or subprograms which are flowcharted in FIGS. 4, 7, 10, 13, 18, 25, 26, and 29-34 and which are needed in use of the FIG. 1 disk player.

As the original TOC from the disk 1 is first stored on the RAM 14, the ending address adding means 26 adds to this TOC the ending addresses of all the tunes listed therein, thereby creating the expanded TOC. The ending address of each tune is equivalent as aforesaid to the starting address of the next tune in this embodiment of the invention. The ending address of the last prerecorded tune is the same as the starting address of the lead-out section 45.

Also connected to the RAM 14, the editing means 27 is additionally connected to the input means 11, FIG. 1, by way of the signal path 11$_a$ for editing the expanded TOC on the RAM as instructed from the input means. Such editing instructions include the dividing, joining, skipping, or moving of the tunes.

The playback control means 28 is likewise connected to both input means 11 and RAM 14 for causing the tunes to be played as instructed from the input means. For such playback control the playback control means 28 has three output signal paths 9$_a$, 9$_b$ and 9$_c$ for connection to the parts seen in FIG. 1.

The display control means 29 is connected by way of a signal path 9$_d$, either wired or wireless, to the display 10 for controlling the same. The display 10 is understood to visually indicate at least the track number of the tune being played and the track address in terms of absolute time expressed in minutes, seconds and frames. The user is therefore enabled to ascertain from the display 10 the desired addresses of the tunes needed for editing.

Although FIG. 1 shows but one controller 9 comprising one CPU, one ROM and one RAM, there could be provided, in substitution for this controller, a combination of a controller for performing mostly mechanical controls and another controller for mostly signal processing. A RAM dedicated to the storage of the expanded TOC according to the invention could also be provided in addition to the preexisting RAM 14.

With continued reference to FIG. 1 the input means 11 is conventionally furnished with a PLAY button 15, STOP button 16, PAUSE button 17, PREV TRACK button 18, and NEXT TRACK button 19. Additionally, according to the novel concepts of this invention, there are provided a DIVIDE button 20, JOIN button 21, SKIP button 22, MOVE START button 23, MOVE END button 24, and MOVE button 25, all for enabling the user to variously edit the expanded TOC on the RAM 14 and hence to variously program the playback of the prerecorded tunes on the disk 1. A user actuation of these buttons 15-25 results in that of the associated switches, not shown, by which the CPU 12 of the controller 9 is notified of the instructions that have been input by the user.

The CPU 12, ROM 13, RAM 14, and input means 11 constitute the data processing means according to the invention. The RAM 14 is utilized for data processing purposes in addition to the storage of the original and expanded TOCs.

The expanded TOCs before being edited or after being edited are diagrammed in FIGS. 5, 6, 8, 9, 11, 12, 14-17, 19-24 and 27. An example of the expanded TOC to be created and stored on the RAM 14 according to the novel concepts of this invention has the following sections:

$M_a$: The section for storing the first track number, designated First.

$M_b$: The section for storing the last track number, designated Last.

$M_{1a}$: The section for storing the starting address of the first track, designated "Start [0]".

$M_{1b}$: The section for storing the ending address of the first track, designated "End [0]".

$M_{2a}$: The section for storing the starting address of the second track, designated "Start [1]".

$M_{2b}$: The section for storing the ending address of the second track, designated "End [1]".

$M_{3a}$: The section for storing the starting address of the third track, designated "Start [2]".

$M_{3b}$: The section for storing the ending address of the third track, designated "End [2]".

$M_{4a}$: The section for storing the starting address of the fourth track, designated "Start [3]".

$M_{4b}$: The section for storing the ending address of the fourth track, designated "End [3]".

$M_{98a}$: The section for storing the starting address of the ninety-eighth track, designated "Start [97]".

$M_{98b}$: The section for storing the ending address of the ninety-eighth track, designated "End [97]".

$M_{99a}$: The section for storing the starting address of the ninety-ninth track, designated "Start [98]".

$M_{99b}$: The section for storing the ending address of the ninety-ninth track, designated "End [98]".

It is understood that between the sections $M_{4b}$ and $M_{98a}$ above, there exist the sections (to be referred to as $M_{5a}$ to $M_{97a}$) for storing the starting addresses of the fifth to ninety-seventh tracks (to be designated "Start [4]" to "Start [96]"), and the sections (to be referred to as $M_{5b}$ to $M_{97b}$) for storing the ending addresses of the fifth to ninety-seventh tracks (to be designated "End [4]" to "End [96]").

The sections $M_a$ to $M_{99a}$ of the above expanded TOC can be generally expressed as $M_{(1-n)a}$ and the sections $M_b$ to $M_{99b}$ as $M_{(1-n)b}$.

The starting address sections $M_{1a}$-$M_{99a}$ and ending address sections $M_{1b}$-$M_{99b}$ of the expanded TOC store the addresses in terms of absolute time indicative of the cumulative playback time of the program area of the CD. How such data is stored on the expanded TOC will be detailed presently.

Figure 4:
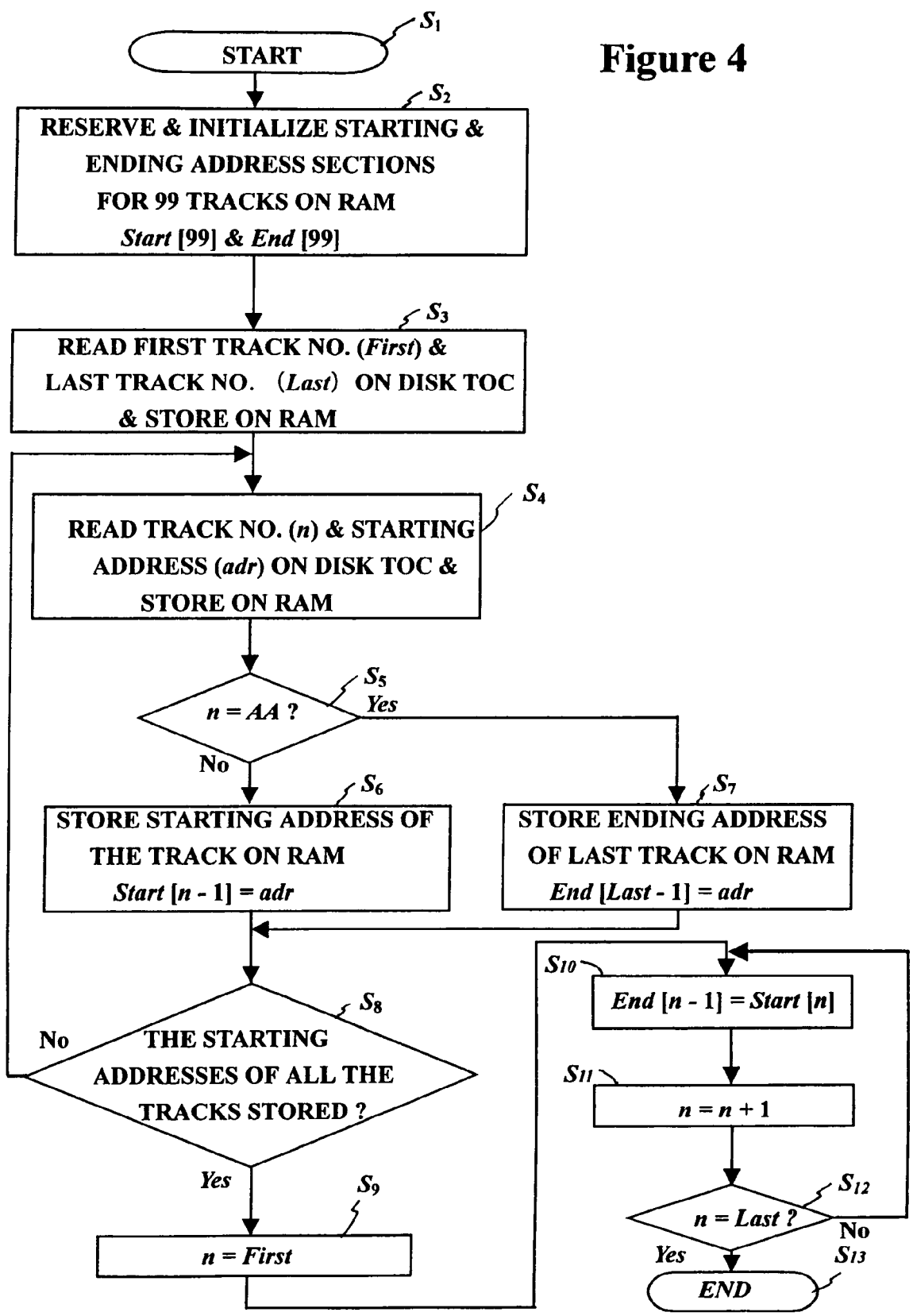
FIG. 4 is a flowchart of a "read and expand TOC" program introduced into the FIG. 1 disk player for reading the original TOC on the loaded disk and creating the expanded TOC according to the invention.

Each time the disk 1 is loaded in the FIG. 1 disk player, the "read and expand TOC" program for creation of the expanded TOC according to the invention will be automatically invoked as at Step $S_1$ in FIG. 4. Then, at Step $S_2$, the starting address sections $M_{1a}$-$M_{99a}$ and ending address sections $M_{1b}$-$M_{99b}$ for possible ninety-nine prerecorded tunes are reserved and initialized on the RAM 14, FIG. 1, of the controller 9 preparatory to the creation of the expanded TOC.

All the subsequent steps of the FIG. 4 flowchart occur in conjunction with the TOC data read on the disk 1. First, at Step $S_3$, the first track number indicative of the first prerecorded tune, shown at 41 at (A) in FIG. 3, on the disk 1 is written on the RAM section $M_a$ as the variable First. The first track number is usually one. The track number of the last prerecorded tune on the disk 1 is written on the RAM section $M_b$ as the variable Last. The last track number may be any of one to ninety-nine inclusive in practice.

Then, at Step $S_4$, the variables indicative of the track numbers and their starting addresses are written on other than the expanded TOC region of the RAM 14, or on a memory, not shown, other than the RAM 14, as such track numbers and starting addresses are input repeatedly. The track numbers are written as the variable n, and the starting addresses as the variable adr, in this embodiment of the invention. Only one track number with its starting address is assumed to be written at one time at Step $S_4$ of this flowchart, but the starting addresses of all the tracks could be written instead at this step.

Then comes Step $S_5$ which asks whether the track number n that has been just read on the disk 1 at Step $S_4$ is that of the lead-out track AA on the lead-out section 45, seen at (A) in FIG. 3, of the disk 1. If the answer is "no", the input starting address adr is written on the associated one of the variable "Start [n-1]" sections that have been reserved on the RAM 14, according to Step S6. Since n=1, for instance, if the first track number is "one", the starting address A1 of the first program subsection 41, FIG. 3, is written on the RAM section M1a which has been reserved for the first track and which is indicated as the variable "Start [n-1]"="Start [0]".

The variables to be stored on the sections $M_{1a}$, $M_{2a}$, $M_{3a}$, ... $M_{99a}$ of the expanded TOC on the RAM 14 are all generally expressed as "Start [n-1]", and the variables to be stored on the sections $M_{1b}$, $M_{2b}$, $M_{3b}$, ... $M_{99b}$ as "End [n-1]". It is thus seen that the variable "Start [0]" at the section $M_{1a}$, for instance, indicates the starting address of the first track. However, the variables "Start [n-1]" and "End [n-1]" are both for the sake of convenience only; instead, for example, "Start [n]" and "End [n]" could be employed in their places. The bracketed numbers in the variables in this latter case will then agree with the actual track numbers which they represent.

The starting addresses written on the RAM sections $M_{1a}$, $M_{2a}$, $M_{3a}$, ... $M_{99a}$ are designated as the variable adr in the FIG. 4 flowchart.

The first track number is "one" in most commercial CDs. But this statement is not necessarily true as in the case where two or more CDs are packaged in one set or in the case of CD-XAs or the like which have both computer data and music prerecorded thereon.

The FIG. 4 program returns to Step $S_4$ via Step $S_8$ upon completion of Step $S_6$. The next track with its starting address is taken in from the disk TOC at Step $S_4$. The starting address of Track No. 2 is stored on the "Start [1]" section $M_{2a}$ of the RAM 14, the starting address of Track No. 3 on the "Start [2]" section $M_{3a}$ of the RAM, and so forth, until all the required starting addresses are stored by the repetition of Steps $S_4$-$S_6$. Whether all the starting addresses have been stored on the RAM 14 is determined at Step $S_8$.

Step $S_7$ will come after Step $S_5$ if the track number n that has been just read on the disk 1 at Step $S_4$ is that of the lead-out track AA on the lead-out section 45, FIG. 3(A), of the disk 1. At this Step $S_7$ the starting address adr of the lead-out track AA is written on that one of the RAM sections $M_{1b}$, $M_{2b}$, ... $M_{99b}$ which is to store the ending address of the last prerecorded tune on the disk 1. If the track number of the last prerecorded tune is four, for instance, then n=4, so that "End [n-1]"="End [3]". The address adr may then be stored on the RAM section $M_{4b}$ as the ending address of the last prerecorded tune. Since the variable indicative of the last track number has been assumed to be Last, the variable for the ending address of the last prerecorded tune can be expressed as "End [Last-1]".

Upon implementation of Step $S_7$ there has been completed the filling of the starting address sections $M_{1a}$-$M_{(n-1)a}$ for the first to last tracks on the disk 1 and of the ending address section $M_{(n-1)b}$ for the last track. TOC reading on the disk 1 has now come to an end. The rest of the procedure for construction of the expanded TOC is to proceed internally of the controller 9.

Although the starting addresses of all the prerecorded tunes have been stored as above on the starting address sections $M_{1a}$-$M_{(n-1)a}$ as represented by the variable "Start [n-1]", no ending addresses are yet stored on the ending address sections $M_{1b}$-$M_{(n-2)b}$ represented by the variable "End [n-2]", with an exception of the starting address of the lead-out track AA stored the last track section $M_{(n-1)b}$ on which there is stored the starting address of the lead-out track AA as the ending address of the last prerecorded tune. The remaining ending address sections $M_{1b}$-$M_{(n-2)b}$ are to be filled as discussed hereinbelow.

At Step $S_9$, which comes after all the starting address sections of the RAM 14 has been filled up at $S_8$, the first track number First on the RAM section $M_a$ is written as the variable n on other than the TOC area of the RAM 14. The first track number may be one. The variable n is to serve as a count.

Then, at Step $S_{10}$, the starting address of each n'th tune is copied on the ending address section $M_{(n-1)b}$ of the (n-1)'th tune as the ending address of the (n-1)'th tune represented by the variable "End [n-1]". In the case where n=1, for example, the starting address "Start [1]" of the RAM section $M_{2a}$ is copied on the section $M_{1b}$ as the variable "End [n-1]", which in this case is "End [0]". Thus is the starting address of the second tune used as the ending address of the first tune. Speaking more generally, the starting address of any of the prerecorded tunes on the disk is used also as the ending address of the immediately preceding tune.

The next Step $S_{11}$ dictates the incrementing of the variable n. Whether the variable n has been incremented to the last track number on the disk is ascertained at Step $S_{12}$. If not, the program returns to step $S_{10}$ where the starting address of the next tune is copied as above. The program comes to an end at $S_{13}$ after the variable n has reached the last track number at $S_{12}$.

The above described method of introducing both starting and ending addresses of each tune into the expanded TOC represents but one of many such methods adoptable in the practice of this invention. All that is required is that the starting addresses of the tracks read from the original TOC on the disk be used as such, and as the ending addresses of the previous tracks, in the expanded TOC on the RAM.

The expanded TOC according to the invention is akin to the conventionally recreated TOC in containing the starting addresses of all the prerecorded tunes. The user may therefore reproduce each desired tune from its beginning or program the playback of two or more tunes. Furnished with the ending address of each tune, moreover, the expanded TOC is variously editable; for example, each tune may be virtually divided, joined with another tune, skipped, or moved, as explained in more detail hereinbelow.

Dividing a track:

The expanded TOC is editable by rewriting either or both of the starting address sections $M_{1a}$-$M_{99a}$ and ending address sections $M_{1b}$-$M_{99b}$. Let us first study, as an example of editing, how a track is virtually divided into two. The division of any one tune on the disk is possible, however, only in cases where the disk contains ninety-eight or less tunes. Since a maximum of ninety-nine tunes is recordable on CDs of standard format, the total number of tunes after division of one or more original tunes must be up to ninety-nine and no more. Let it be supported for instance that, as indicated at (A) in FIG. 3, the tune on the first program subsection 41 of the disk is to be divided into two parts $41_a$ and $41_b$. The user may monitor the reproduction of the tune to decide where to divide it. The absolute time contained in the disk reproduction will provide the address of the point where the tune is to be divided. The user will be easy to determine where to divide the tune if he or she is familiar with the relationship between the progress of the tune and the lapse of the absolute time.

According to the invention, the absolute time or absolute address of the track point where the tune is divided is used as both the ending address of the upstream division $41_a$ of the tune and the starting address of its downstream division $41_b$. As one tune is thus divided into two parts or virtually into two tracks, the track numbers of all the succeeding tunes must be incremented. However, on the expanded TOC on the RAM 14, the starting and ending addresses of the pertinent tunes are rewritten instead of the incrementing of the track numbers. A shifting of the starting and ending addresses toward greater track numbers on the expanded TOC is tantamount to the rewriting of the track numbers. The expanded TOC has its starting address sections $M_{1a}$-$M_{99a}$ and ending address sections $M_{1b}$-$M_{99b}$ arranged regularly. The noted downstream shifting of the starting and ending addresses is therefore equivalent to the shifting of the track numbers.

For a closer study of how a track is divided according to this invention, reference may be had to FIGS. 5 and 6 which both show expanded TOCs before and after a track division. The initial three-track expanded TOC of FIG. 5 is edited into the four-track expanded TOC by dividing one of the original three tracks. A detailed inspection of these figures will reveal that the first track is divided at a point [00000500] intermediate its starting address [00000000] at the section Mia and its ending address [00001000] at the section $M_{1b}$. The first tune is thus virtually divided into two parts or substreams or tunes. The upstream part of the original first tune bears the same track number, zero, as the original first tune, and the downstream part bears Track No. 1, so that the last track number on the RAM section $M_b$ has increased from three to four. Although the numerals 0-98 are used as track numbers in the expanded TOC, the numerals 1-99 could be employed instead.

The downstream division or substream of the original first tune is now a new second tune bearing its own starting address [00000500] at the RAM section $M_{2a}$, FIG. 6, and its own ending address [00001000] at the RAM section $M_{2b}$. This ending address of the new second tune is the same as that of the old first tune. The addresses that have been stored on the RAM sections $M_{2a}$, $M_{2b}$, $M_{3a}$ and $M_{3b}$ of the old expanded TOC in FIG. 5 are now rewritten on the sections $M_{3a}$, $M_{3b}$, $M_{4a}$ and $M_{4b}$ of the new expanded TOC in FIG. 6.

Figure 7:
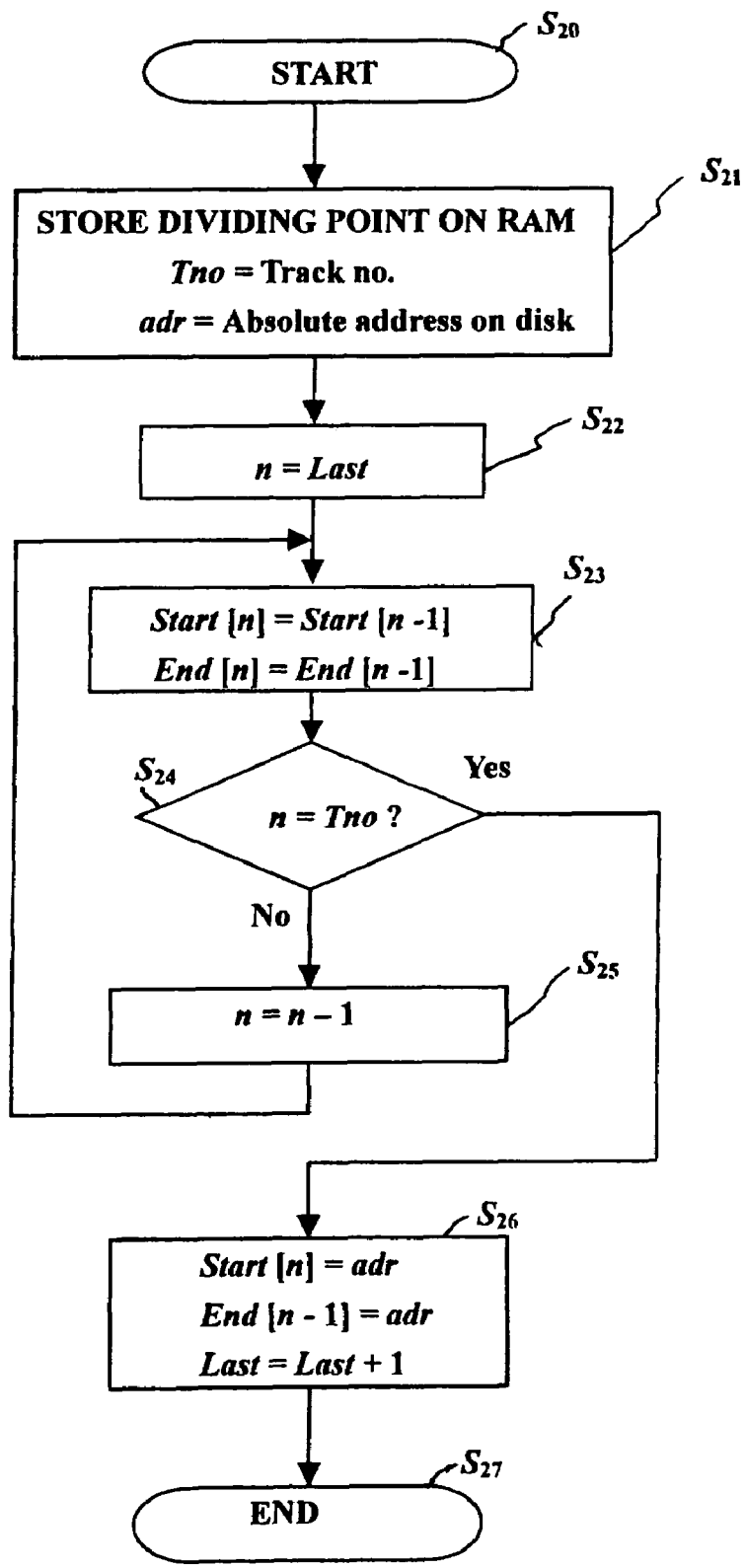
FIG. 7 is a flowchart of a "divide track" program by which the three-track expanded TOC of FIG. 5 is edited into that shown in FIG. 6.

Track division is to proceed according to the "divide track" program flowcharted in FIG. 7. The DIVIDE button 20, FIG. 1, may be depressed either in the course of the playback of the disk 1 by the depression of the PLAY button 15 or the playback is paused by the depression of the PAUSE button 17. It is understood that the expanded TOC has been created on the controller ram 14 in either case. The "divide track" program will start at $S_{20}$, FIG. 7, as the track division instruction is input to the controller 12, FIG. 1, by the depression of the DIVIDE button 20. Step $S_{21}$ dictates the extraction from the subcode areas 31, FIG. 3 (C), of the disk the absolute time on the disk (absolute address) when the DIVIDE button 20 is depressed. The extracted absolute time is written on some appropriate part of the RAM 14 as the variable adr. It is understood that the RAM 14 conventionally holds the current track number during playback or pause. The current track number is defined as the variable Tno.

At Step $S_{22}$ the variable n is defined somewhere on the RAM 14 to constitute a software counter, and the last track number Last before track division is written thereon as n=Last.

Then, at Step $S_{23}$, the (n-1)'th variables Start and End are written as the n'th in the expanded TOC. This is because the variables Start and End of the first prerecorded tune are both designated [0], or n-1 rather than n. Referring once again to FIGS. 5 and 6, the total number of the prerecorded tunes on the disk is three before track division, as in FIG. 5. The last track number Last is three, but the addresses of the last track are designated "Start [2]" and "End [2]", bearing the numeral that is less by one than the actual last track number. If now the actual last track number, three, is added to the variables Start and End, an additional track will be created. The starting and ending addresses of Track No. 3 can be used as the starting and ending addresses of Track No. 4 by copying "Start [2]" on "Start [3]", and "End [2]" on "End [3]". Now the information at the RAM sections $M_{3a}$ and $M_{3b}$, FIG. 5, has been copied on the ram sections $M_{4a}$ and $M_{4b}$, FIG. 6, respectively.

Then, at Step $S_{24}$, it is ascertained whether or not the count of the counter n has reached the current track number. If not, the counter n is decremented at the next Step $S_{25}$, from which the program returns to Step $S_{23}$. Referring to FIGS. 5 and 6 again, the starting and ending addresses of Track No. 2 at the RAM sections $M_{2a}$ and $M_{2b}$ will be copied as the starting and ending addresses of Track No. 3 at the RAM sections $M_{3a}$ and $M_{3b}$ of FIG. 6 according to Step $S_{23}$. The same cycle of operation will repeat itself until the current track is reached, with the starting and ending addresses of each track that comes after the current track copied as the starting and ending addresses of the following track.

Step $S_{26}$ follows Step $S_{24}$ when the count of the counter n reaches the current track number Tno. The address of the dividing point of the track in question is written at this Step $S_{26}$ both as the starting address of the track downstream of the dividing point and as the ending address of the track upstream of the dividing point. Since the address information of the track being divided has been copied as that of the next track at Step $S_{23}$, the track division will be completed if the address of the dividing point is written on the RAM 14 according to Step $S_{26}$. As will be better understood by referring once again to FIGS. 5 and 6, the information at the RAM sections $M_{1a}$ and $M_{1b}$, FIG. 5, was copied on $M_{2a}$ and $M_{2b}$, respectively, at Step $S_{23}$ immediately before implementation of Step $S_{26}$, so that the track division is to be completed when the address of the dividing point is stored according to Step $S_{26}$ on the RAM sections $M_{1b}$ and $M_{2a}$ as in FIG. 6.

Thus the expanded TOC according to the invention has been edited from its initial version in FIG. 5 to the edited version in FIG. 6. The disk 1 now loaded in the FIG. 1 disk player can now be played as dictated by the edited TOC of FIG. 6. The audio information recovered from the disk 1 may be delivered either as an analog signal from the analog output $5_a$ or as a digital signal from the digital output $6_a$. As desired, an MD or CD-R recorder or the like may be connected to the digital output $6_a$ for rerecording the reproduction from the disk 1 according to the edited TOC of FIG. 6. Further, as an optional feature of the invention, the edited TOC may be stored on an EEPROM, fixed memory or the like for repeated use. It will also be apparent from the foregoing that each track is divisible into three or more parts.

Joining Tracks:

The expanded TOC also permits the user to join two or more tracks into a virtual one. FIGS. 8 and 9 show an expanded TOC before and after joining two tracks. The initial three-track expanded TOC of FIG. 8 is shown in FIG. 9 as edited into a two-track expanded TOC by joining the first two original tracks. Thus, as will be noted from a closer study of these figures, the first track starting address section $M_{1a}$ of the FIG. 9 edited TOC contains the same address [00000000] as the first track starting address of the FIG. 8 unedited TOC. However, the first track ending address section $M_{1b}$ of the FIG. 9 edited TOC contains the ending address [00002000] of the original second track given at $M_{2b}$ in FIG. 8. The starting and ending addresses of the second track in the FIG. 9 edited TOC are the same as the starting and ending addresses, respectively, of the original third track in the FIG. 8 unedited TOC.

The following are the rules that must be complied with in rewriting the expanded TOC for joining tracks, as from FIG. 8 to FIG. 9:

1. The last track number at the last track section $M_b$ of the edited TOC must be less than that at the same section of the unedited TOC by a number equal to the track joinings that have been made.
2. The starting and ending addresses of the virtually one track created by joining two or more original tracks must be the same as the starting address of the first of the original tracks that have been joined and the ending address of the last of the original tracks that have been joined, respectively.
3. The starting and ending addresses of the original track that immediately follows the joined tracks must be shifted down according to the number of tracks that have decreased by joining.

Figure 10:
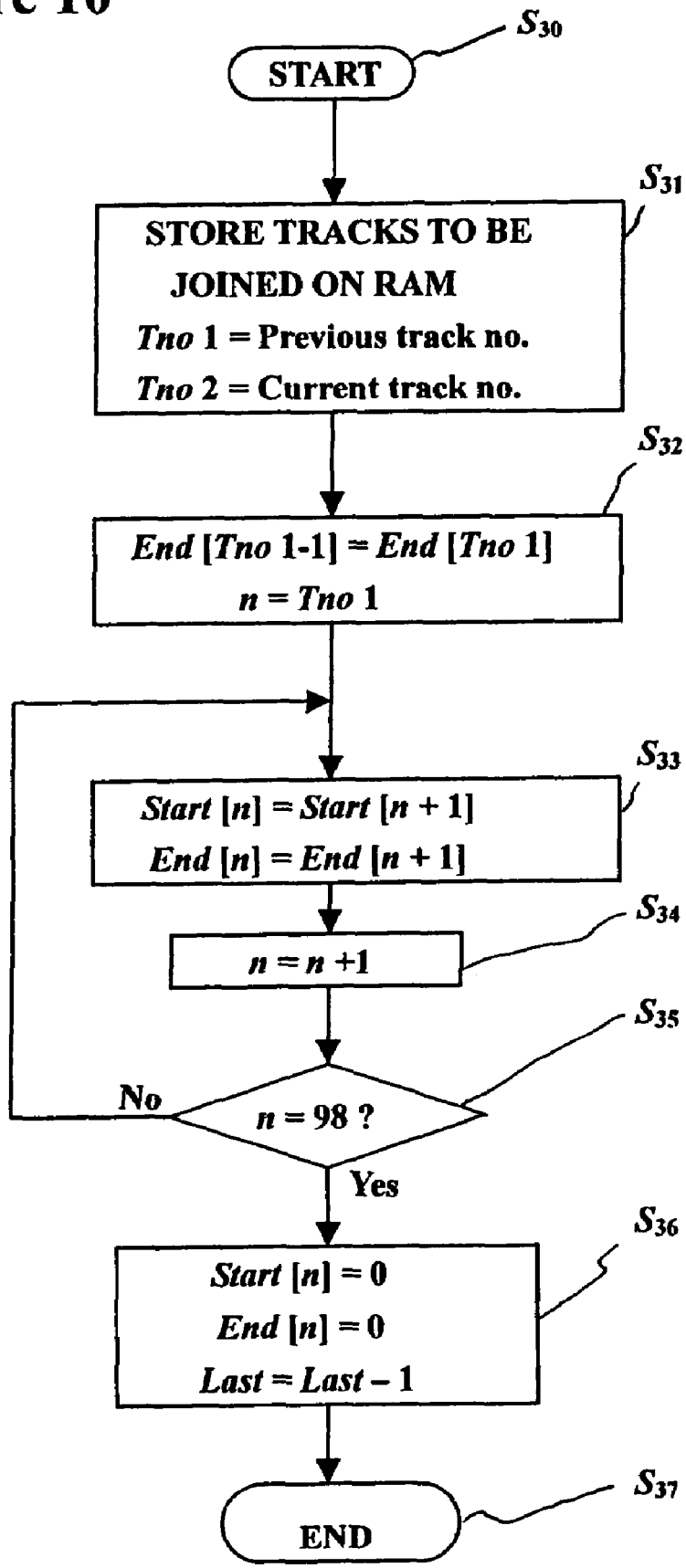
FIG. 10 is a flowchart of a "join tracks" program by which the three-track expanded TOC of FIG. 8 is edited into the two-track TOC of FIG. 9.

FIG. 10 shows a "join tracks" program introduced into the controller 9 of the FIG. 1 disk player in order to permit the user to join tracks as from the FIG. 8 expanded TOC into that shown in FIG. 9. The "join tracks" program will start at $S_{30}$ when the JOIN button 21, FIG. 1, of the input means 11 is depressed either during playback of a track to be joined to the previous track or during a pause in the course of such playback. Thereupon, at Step $S_{31}$, the track numbers to be combined are written on some selected area of the RAM 14. The tracks to be combined are the track, designated Tno2, that has been played when the JOIN button 21 is actuated and the immediately preceding track designated Tno1.

Then, at Step $S_{32}$, the ending address (e.g. [00002000]) of the track that has been played at the time of JOIN button depression is stored on the ending address section of the preceding track.

Then, at Step $S_{33}$, the starting and ending address sections of the track that has been played at the time of JOIN button depression have stored thereon the starting and ending addresses of the immediately succeeding track.

The following Steps $S_{34}$ and $S_{35}$ are devoted to the upward shifting of the starting and ending addresses of the changed track numbers. When the starting and ending addresses of all the pertinent track numbers have been rewritten at Step $S_{35}$, the RAM section $M_b$ of the last track number Last is rewritten according to Step $S_{36}$. Then the "join tracks" program comes to an end at $S_{37}$.

With the "join tracks" program thus executed, and the expanded TOC edited as in FIG. 9, the disk 1 will be played or rerecorded according to the edited TOC.

Skipping Tracks:

Given the expanded TOC of FIG. 1 according to the instant invention, the user can also readily skip any track or tracks on the disk 1 so that all but such undesired track or tracks on the disk may be played. FIGS. 11 and 12 show expanded TOCs before and after the skipping of a track. The initial three-track expanded TOC of FIG. 11 is shown in FIG. 12 as edited into a two-track expanded TOC by skipping the second track on the disk. Thus the starting address [00001000] and ending address [00002000] of the original second track, given at RAM sections $M_{2a}$ and $M_{2b}$ in FIG. 11, are both absent from the edited TOC of FIG. 12. The starting address [00002000] and ending address [00003000] of the original third track on the FIG. 11 RAM sections $M_{3a}$ and $M_{3b}$ are stored instead on the FIG. 12 RAM sections $M_{2a}$ and $M_{2b}$ as the starting and ending addresses, respectively, of the new second track. The starting and ending addresses of the first track remain the same after the editing of the expanded TOC. Another change is the last track number on the RAM section $M_b$.

The expanded TOC may be rewritten in compliance with the following rules when a track or tracks are to be skipped:
1. The last track number at the last track section Mb of the edited TOC must be less than that at the same section of the unedited TOC by a number equal to the track or tracks that have been skipped.
2. The track that has gained the track number of the skipped tune in the edited TOC should be given the starting and ending addresses of the track that immediately followed the skipped track in the unedited TOC. All the subsequent tracks should have their starting and ending addresses shifted correspondingly.

Figure 13:
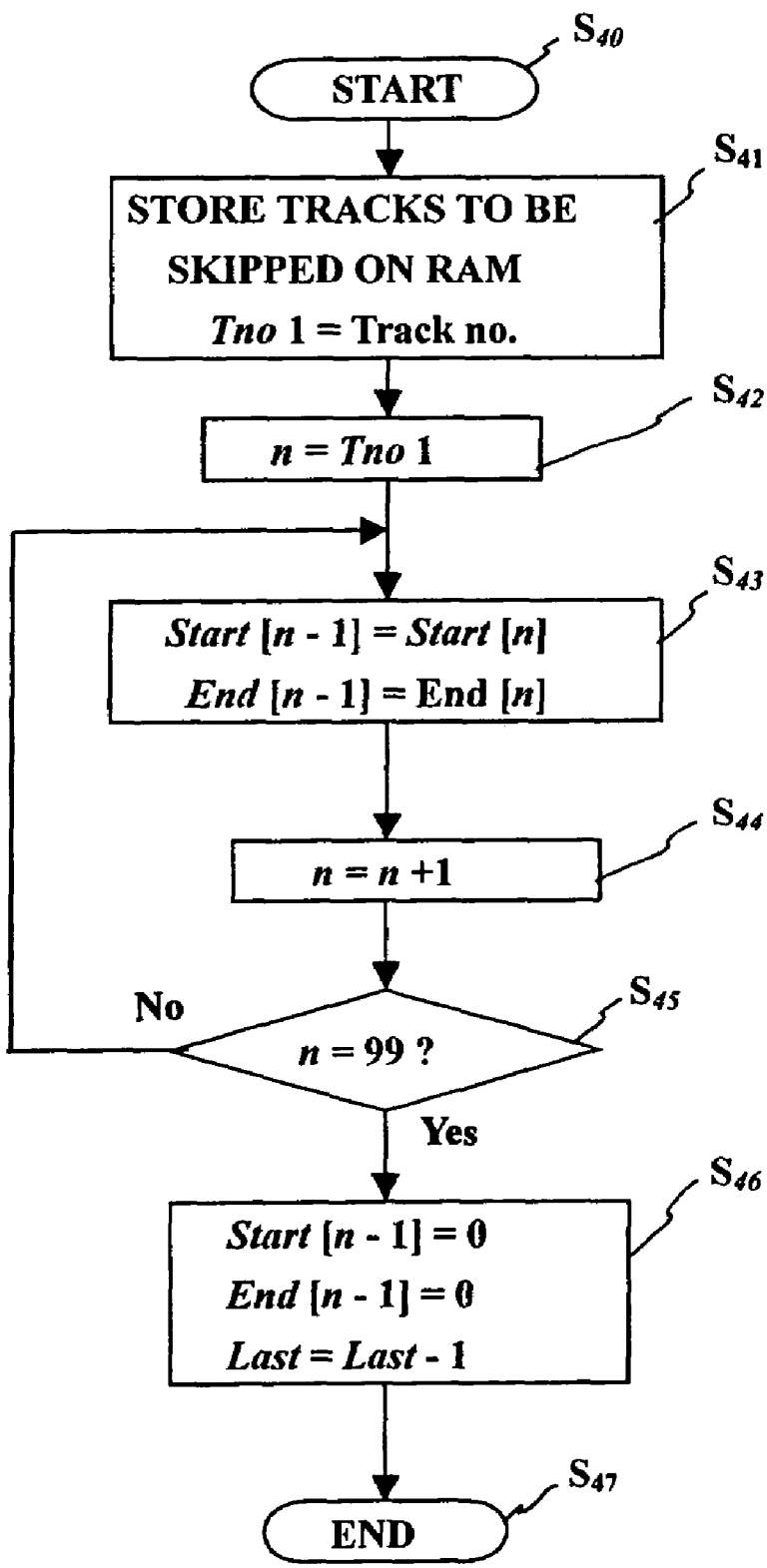
FIG. 13 is a flowchart of a "skip tracks" program by which the three-track expanded TOC of FIG. 11 is edited into the two-track TOC of FIG. 12.

The expanded TOC is edited from FIG. 11 to FIG. 12 by the "skip tracks" program flowcharted in FIG. 13. The "skip tracks" program will start at Step $S_{40}$ when the SKIP button 22, FIG. 1, is depressed either during playback of the disk 1 or during a pause in the course of playback. The track to be skipped will be written on some selected part of the RAM 14 at the next Step $S_{41}$. The track to be skipped is the track that has been being played when the SKIP button 22 is actuated. The track number to be skipped is designated Tno1.

Then, at Step $S_{42}$, the track number to be skipped (that of the second tune in this case) is read out from the RAM 14. According to the next Step $S_{43}$, the starting and ending addresses of the track following the track to be skipped are rewritten on the starting and ending address sections that have stored the starting and ending addresses of the track to be skipped. Then the starting and ending addresses of all the succeeding tracks are shifted by the repetition of Steps $S_{43}$-$S_{45}$.

The cyclic execution of Steps $S_{43}$-$S_{45}$ will terminate when the starting and ending addresses of all the required tracks are rewritten. Thereupon the last track number Last is to be rewritten, in this case from three to two, on the RAM section $M_b$ at Step $S_{46}$. Then the "skip tracks" program is completed at Step $S_{47}$. The disk 1 may now be automatically played back or rerecorded with the second prerecorded tune skipped according to the edited TOC of FIG. 12.

Moving the Beginning or End of a Track:

A further functional feature gained by use of the expanded TOC is to move the beginning or end of each tune; that is, any selected tune may be played back from an arbitrary beginning to an arbitrary end. The parts of the tune from the true beginning to the arbitrary beginning, and from the arbitrary end to the true end, will then be skipped.

FIGS. 14 and 15 show a three-track expanded TOC before and after the beginning of one of the tracks is moved. More specifically, the beginning of the second prerecorded tune is altered from the true starting address [00001000] at the RAM section $M_{2a}$ in FIG. 14 to the arbitrarily selected starting address [00001200] at the same RAM section $M_{2a}$ in FIG. 15. The part of the second tune from [00001000] to [00001199] has been skipped.

FIGS. 16 and 17 show a similar three-track expanded TOC before and after moving the end of the second prerecorded tune. It will be observed that the end of the second tune is changed from the true ending address [00002000] at the RAM section $M_{2b}$ in FIG. 16 to the arbitrarily selected ending address [00001800] at the same RAM section $M_{2b}$ in FIG. 17.

Figure 18:
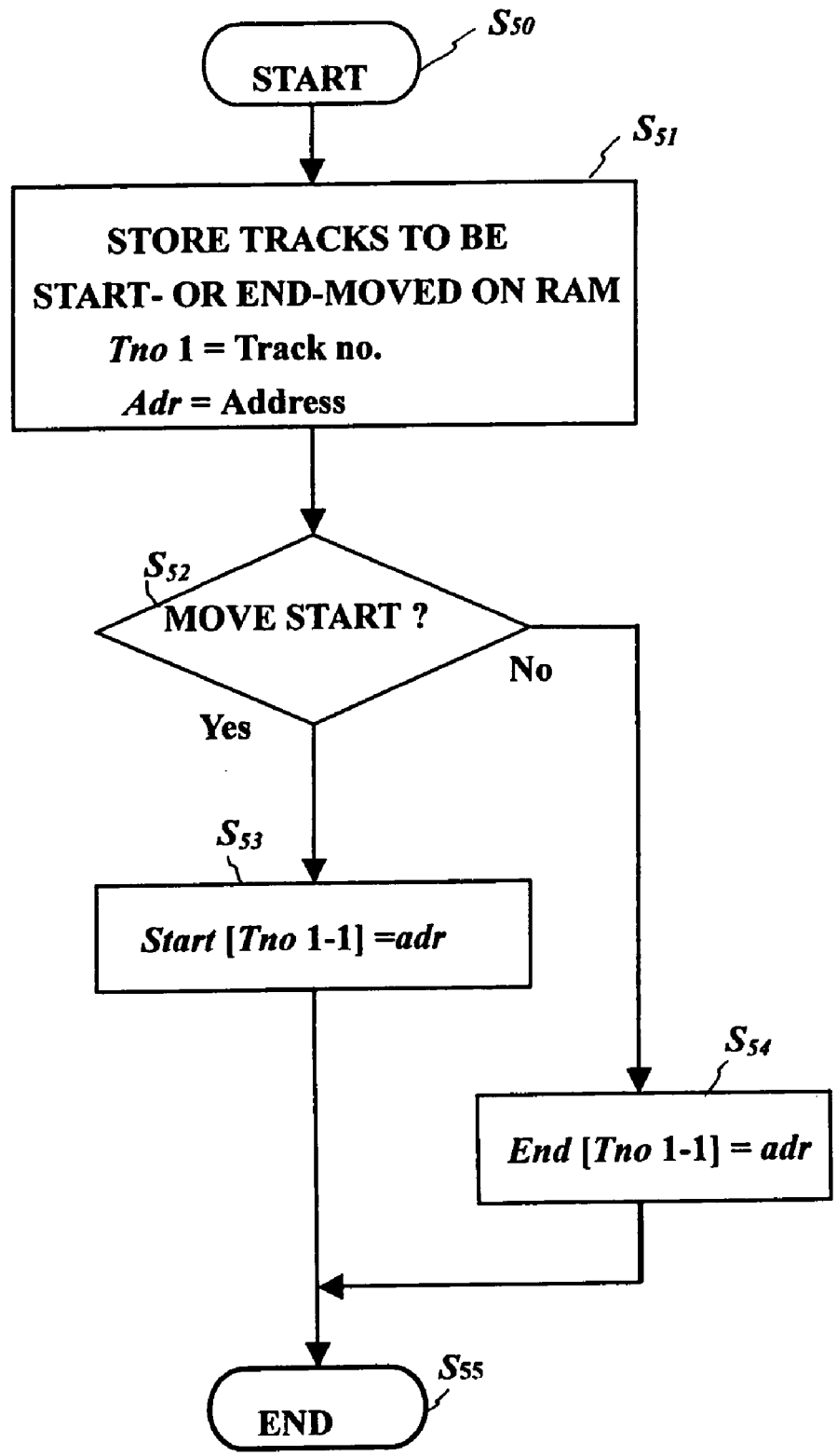
FIG. 18 is a flowchart of a "move start or end" program by which the beginning or end of a desired track is moved as from FIG. 14 to 15 or from FIG. 16 to 17.

The beginning or end of any selected tune is to be moved according to the "move start or end" program flowcharted in FIG. 18. This program will be invoked and start at Step $S_{50}$ when either the MOVE START button 23, FIG. 1, or the MOVE END button 24 is actuated either during playback of any tune on the disk 1 or during a pause in the course of such playback. Thereupon, according to Step $S_{51}$, there are stored on selected parts of the RAM 14 both track number and address (absolute time derived from the disk read signal) when either the MOVE START button 23 or the MOVE END button 24 is depressed.

The next Step $S_{52}$ is the determination of whether it is the MOVE START button 23 or MOVE END button 24 that has been actuated. Let us assume that the MOVE START button 23 has been actuated, and that the second tune has been plated at the time of the actuation. Then the "Start Move?" query posed at Step $S_{52}$ is "yes", so that the program proceeds to Step $S_{53}$ where the starting address section $M_{2a}$ of the expanded TOC on the RAM 14 is rewritten from the true starting address [00001000] indicated in FIG. 14 to the user-selected address [00001200] in FIG. 15. This user-selected address is that which was written on the RAM 14 at Step $S_{51}$. The program is finished at $S_{55}$.

The answer "no" to the Step $S_{52}$ query, on the other hand, means that the MOVE END button 24 was depressed. Then, at the next alternative step $S_{54}$, the ending address section $M_{2b}$ of the expanded TOC on the RAM 14 is rewritten from the true ending address [0000200] in FIG. 16 to the user-selected address [00001800] in FIG. 17 which was written on the RAM at Step $S_{51}$. Then the program is finished at $S_{55}$.

With the expanded TOC of FIG. 14 or 16 edited as in FIG. 15 or 17, the disk 1 may be automatically played back or rerecorded with the undesired initial or terminal part of the tune cut off.

Moving Part of a Track:

Any desired part of a track may be moved and joined to the neighboring track by simultaneous depression of the MOVE START button 23 and MOVE END button 24. A simultaneous actuation of these buttons 23 and 24 is to start a "move part" program which is built into the controller 9, FIG. 1. Let us suppose that the buttons 23 and 24 are jointly actuated at some arbitrary address (e.g. [00001200]) during the reproduction of the second track in the course of disk playback according to the expanded TOC of FIG. 19. Thereupon the track number and the address at the moment of the actuation of the buttons 23 and 24 will be written on the RAM 14, with the consequent editing of the expanded TOC from its FIG. 19 state to that shown in FIG. 20. The CPU 12 of the controller 9 will perform the following operations according to the "move part" program:
1. Rewriting the ending address section, $M_{2b}$ in this case, of the track that had been played when the "move part" command was input, by the address [00001200] at the time that command was input.
2. Rewriting the starting address section $M_{3a}$ of the track next to the one that had been played when the "move part" command was input, by the address [00001200] at the time that command was input.

That part of the track which follows the point on the track where the buttons 23 and 24 were actuated together will then be moved and joined to the next track.

Rearranging Tracks:

The expanded TOC is also editable for rearranging tracks, that is, for playing back the prerecorded tunes in any desired order other than the order in which they are prearranged on the disk. FIGS. 21 and 22 show an example of three-track expanded TOC before and after track rearrangement, and FIGS. 23 and 24 another example of three-track expanded TOC before and after another example of track arrangement. A comparison of FIGS. 21 and 22 will reveal that the first and the second track are reversed in order; that is, the addresses at the sections $M_{2a}$ and $M_{2b}$ of the original expanded TOC in FIG. 21 are moved to the sections $M_{1a}$ and $M_{1b}$ of the edited TOC in FIG. 22, and the addresses at the sections $M_{1a}$ and $M_{1b}$ of the original expanded TOC to the sections $M_{2a}$ and $M_{2b}$ of the edited TOC. Thus the disk tracks are to be reproduced in the order of the second, first and third according to the edited TOC of FIG. 22.

The other example of track rearrangement given in FIGS. 23 and 24 represents a reversal in order of the second and the third track. The addresses at the sections $M_{2a}$ and $M_{2b}$ of the original expanded TOC in FIG. 23 are moved to the sections $M_{3a}$ and $M_{3b}$ of the edited TOC in FIG. 24, and the addresses at the sections $M_{3a}$ and $M_{3b}$ of the original expanded TOC to the sections $M_{2a}$ and $M_{2b}$ of the edited TOC. The disk tracks are therefore to be reproduced in the order of the first, third and second according to the edited TOC of FIG. 24.

The controller 9 performs the following functions for rearranging tracks:

1. Recognizing the track numbers to be rearranged.
2. Writing the starting and ending addresses of one of the tracks to be rearranged on the starting and ending address sections of the other track on the expanded TOC.
3. Writing the starting and ending addresses of said other track on the starting and ending address sections of said one track on the expanded TOC.

Figure 25:
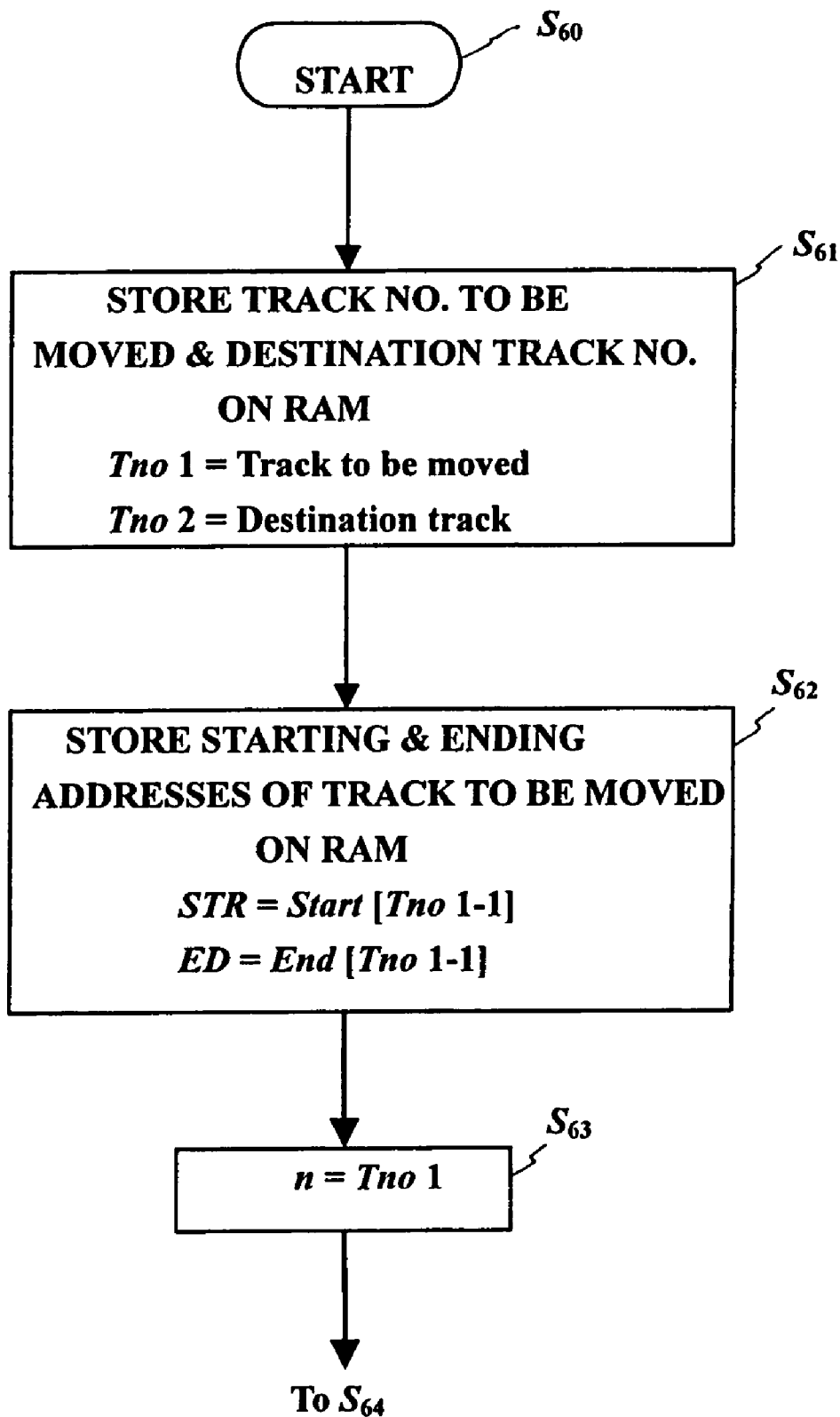
FIG. 25 is a flowchart of part of a "rearrange tracks" program by which the disk tracks are rearranged as from FIG. 21 to 22 or from FIG. 23 to 24.
Figure 26:
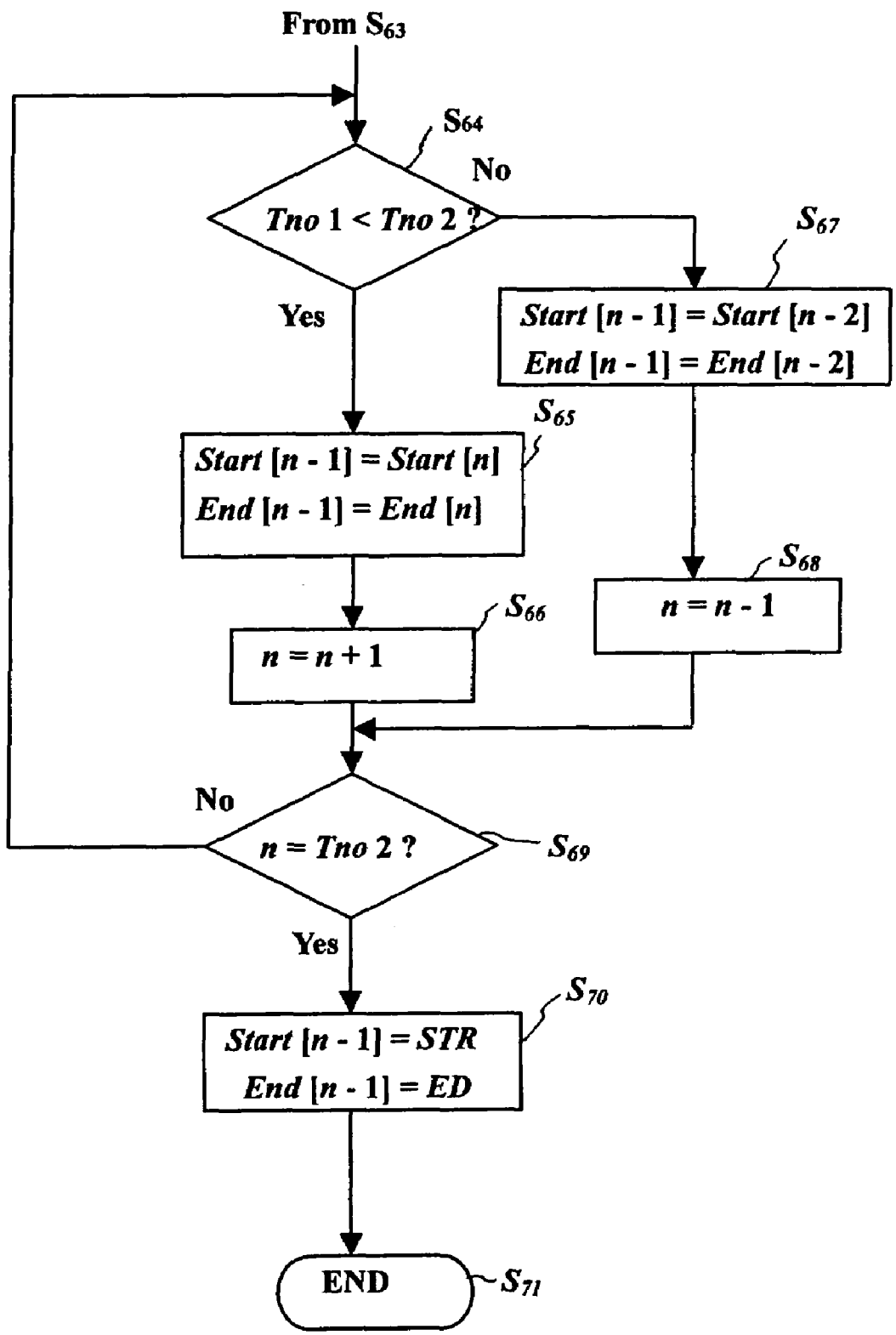
FIG. 26 is a flowchart of the rest of the "rearrange tracks" pro-gram of FIG. 25.

FIGS. 25 and 26 show the "rearrange tracks" program introduced into the controller 9. The program starts at Step $S_{60}$ when the MOVE button 25, FIG. 1, is actuated either during disk playback or during a pause in the course of such playback. The number of the track that has been being played at the time of MOVE button actuation is stored on the RAM 14 at Step $S_{61}$. This track number, designated Tno1, is that of the track (hereinafter referred to as the first track) to be moved, whereas the number of the track to which the first track is to be moved (hereinafter referred to as the second track) is designated Tno2.

At this time the display 10, FIG. 1, is to exhibit both first track number Tno1 and second track number Tno2. The user may determine the second track number Tno2 by pushing either PREV TRACK button 18 or NEXT TRACK button 19 until the desired track number is exhibited and then by pushing the MOVE button 23. Digit keys with an associated "enter" key or the like could be provided in addition to the buttons 15-25 of the input means 11 for greater ease of choosing the second track. An additional button could also be provided for determination of the second track.

Then, at Step $S_{62}$ in FIG. 25, the starting and ending addresses of the first track are temporarily stored on other than the expanded TOC area of the RAM 14.

Then, at Step $S_{63}$, the first track number Tno1 and the second track number Tno2 are both read out from the RAM 14. Then it is determined at the next Step $S_{64}$, FIG. 26, which of these track numbers Tno1 and Tno2 is greater than the other. If the second track number Tno2 proves to be greater than the first track number Tno1 at Step $S_{64}$, then at Step $S_{65}$ there are written on the starting and ending address sections of the first track the starting and ending addresses of the next greater track number. The track number n is incremented at the next Step $S_{66}$.

On the other hand, if the first track number Tno1 proves to be greater than the second track number Tno2 at Step $S_{64}$, then at Step $S_{67}$ there are written on the starting and ending address sections of the first track the starting and ending addresses of the next smaller track number (n−2). Then the track number n is decremented at the next Step $S_{68}$.

Then, at Step $S_{69}$ which follows both Steps $S_{66}$ and $S_{68}$, it is ascertained whether the track number n has reached the desired second track number Tno2. If not, the Steps $S_{64}$-$S_{68}$ are repeated, with the track number (n+1) of Step $S_{66}$ or track number (n−1) of Step $S_{68}$ taken as the second track number Tno2. On the other hand, if the track number has proved to have reached the second track number Tno2 at Step $S_{69}$, then the starting and ending addresses of the first track are written on the starting and ending address sections of the second track at Step $S_{70}$. Then the "rearrange tracks" program comes to an end at $S_{71}$.

Streamlined Playback:

Since the user is free to rearrange the tracks in any way thanks to this invention, some tracks may be reversed in order during disk playback according to the expanded TOC, as in the case of FIG. 22. In that case, if the CD being played has some sound recorded between tunes, that sound would be interrupted if the tracks on the CD were played back just as dictated by the edited TOC. Let us suppose two "continuous" tracks in the edited TOC, as manifested by the fact that the first of these tracks has the same ending address as the starting address of the second. The two tracks should then be played continuously, rather than broken apart by a pause customarily introduced between tracks. No renewed playback command is issued for the second track according to this invention in order to assure streamlined continuation in the playback of the two tracks.

The above statement will be better understood from a consideration of FIGS. 27 and 28. FIG. 27 shows by way of example a five-track expanded TOC that has been edited by the user and which includes two continuous tracks. FIG. 28 is explanatory of how the disk is actually played according to the edited TOC of FIG. 27 without a break between the two continuous tracks. It will be observed that, in the FIG. 27 TOC:

The first track number (variable First) to be played is "1" (RAM section Ma).

The last track number (variable Last) to be played is "5" (RAM section Mb).

The starting address of Track No. 1 (variable "Start [0]") is [00000000] (RAM section $M_{1a}$).

The ending address of Track No. 1 (variable "End [0]") is [00001000] (RAM section $M_{1b}$).

The starting address of Track No. 2 (variable "Start [1]") is [00001000] (RAM section $M_{2a}$).

The ending address of Track No. 2 (variable "End [1]") is [00002000] (RAM section $M_{2b}$).

The starting address of Track No. 3 (variable "Start [2]") is [00002500] (RAM section $M_{3a}$).

The ending address of Track No. 3 (variable "End [2]") is [00003000] (RAM section $M_{3b}$).

The starting address of Track No. 4 (variable "Start [3]") is [00004000] (RAM section $M_{4a}$).

The ending address of Track No. 4 (variable "End [3]") is [00005000] (RAM section $M_{4b}$).

The starting address of Track No. 5 (variable "Start [4]") is [00003000] (RAM section $M_{5a}$).

The ending address of Track No. 5 (variable "End [4]") is [00004000] (RAM section $M_{5b}$).

The reader's attention is invited to the fact that, in the edited TOC above, Track No. 1 bears the same ending address [00001000] as the starting address of Track No. 2, and therefore that these two tracks should be played continuously. No two of the other Tracks Nos. 2-5 are continuous, the ending address of each such track being different from the starting address of the next track.

Actual disk playback according to the edited TOC of FIG. 27 may be summarized as indicated in FIG. 28:

1. Continuous playback from playback start track number (Stno) 1 to playback end track number (Etno) 2, that is, from playback start address (STAD) [000000000] to playback end address (EDAD) [00002000].

2. Continuous playback from Stno=3 to Etno=3, that is, from STAD=[000002500] to EDAD=[00003000].
3. Continuous playback from Stno=4 to Etno=4, that is, from STAD=[000004000] to EDAD=[00005000].
4. Continuous playback from Stno=5 to Etno=5, that is, from STAD=[000003000] to EDAD=[00004000].

No interruption will then occur between tracks 1 and 2 during their playback.

Figure 29:
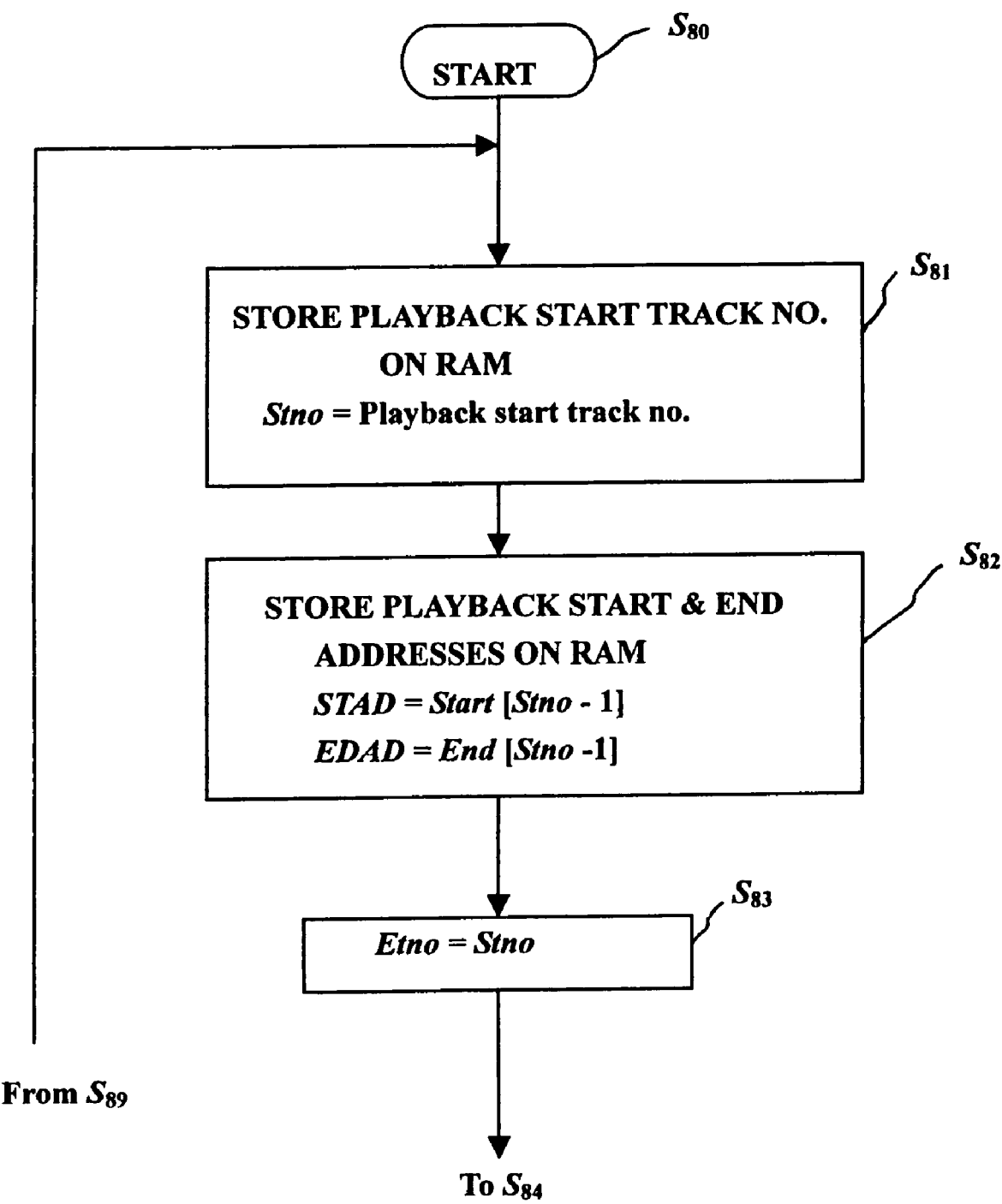
FIG. 29 is a flowchart of part of a program for unbroken playback of continuous tracks such as those in FIG. 28.
Figure 30:
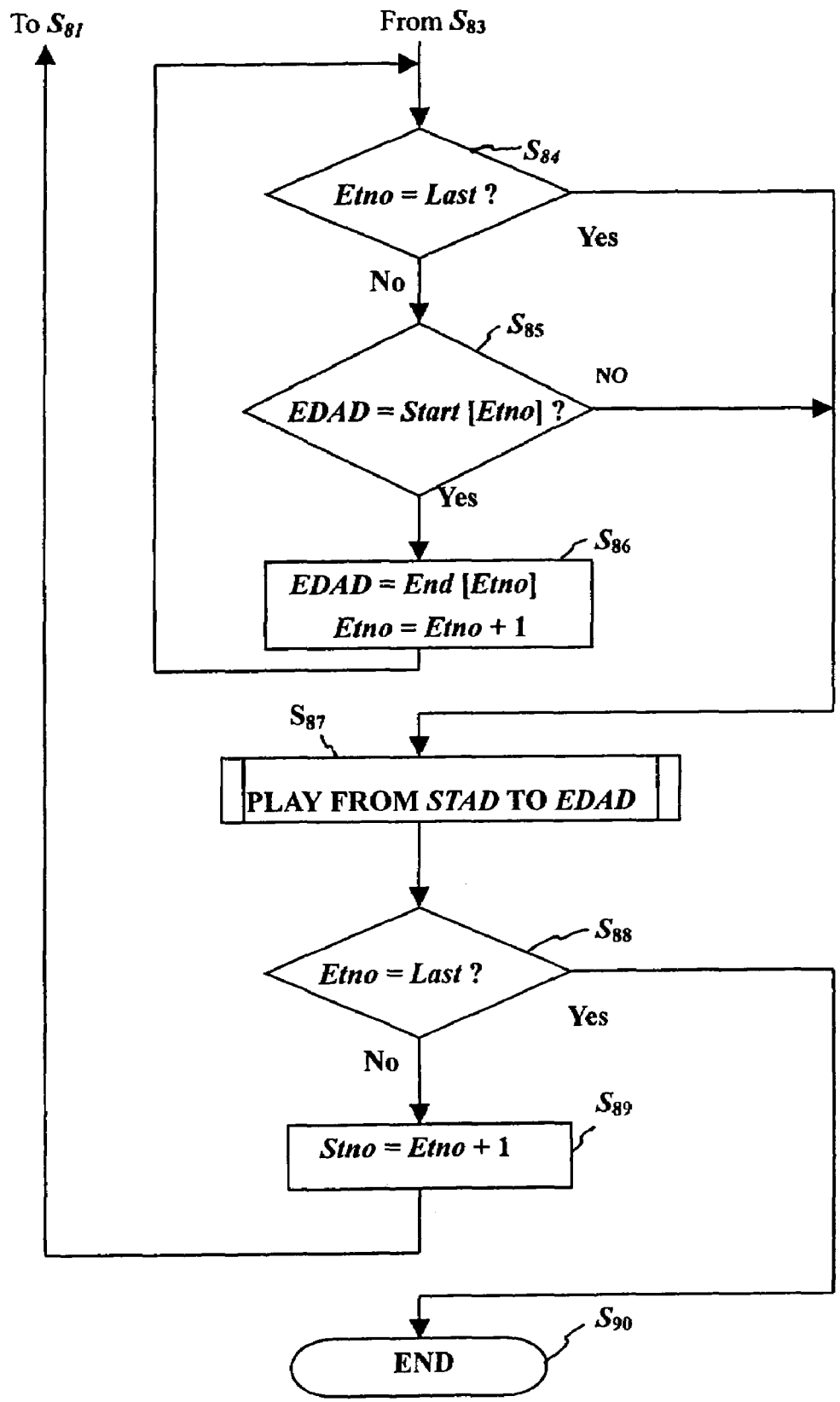
FIG. 30 is a flowchart of the rest of the continuous playback pro-gram of FIG. 29.

FIGS. 29 and 30 in combination show an "unbroken playback" program which may be adopted in the practice of this invention in order to streamline the playback of continuous tracks discussed above with reference to FIG. 28. As the user inputs an "unbroken playback" command at $S_{80}$, the playback start track number is stored on the RAM 14 as the variable Stno at Step $S_{81}$. Then at Step $S_{82}$ the playback start address and playback end address of the track are stored on the ram 14 as the variables STAD and EDAD. Then at Step $S_{83}$ the value of the playback start track number Stno is substituted into the playback end track number Etno.

Next comes Step $S_{84}$ in FIG. 30, which asks if the playback end track number Etno is equal to the last track number Last. If it is, then at Step $S_{87}$ the disk is played from current playback start address STAD to playback end address EDAD. On the other hand, if the playback end track number Etno proves not equal to the last track number Last, the program proceeds to Step $S_{85}$ in order to determine whether the current playback end address EDAD is equal to the playback start address Start [Etno] of the next track.

If the current playback end address EDAD proves different from the playback start address Start[Etno] of the next track at Step $S_{85}$, the program jumps to Step $S_{87}$, as in the case of a "yes" answer to the Step $S_{84}$ query. The disk is then played as above from current playback start address STAD to playback end address EDAD. On the other hand, if the current playback end address EDAD proves the same as the playback start address Start[Etno] at Step $S_{85}$, then here is the case where unbroken playback is to be applied. Therefore, at the next Step $S_{86}$, the playback end address END[Etno] of the next track is substituted into the playback end address EDAD, and the playback end track number Etno is incremented, before returning to Step $S_{84}$.

Steps $S_{84}$-$S_{86}$ of this "unbroken playback" program represent the checking of the edited TOC for continuity between the ending address of each track and the starting address of the next track. The tracks with such continuous ending and starting addresses are played at Step $S_{87}$.

Upon completion of Step $S_{87}$ it is ascertained at the next Step $S_{88}$ whether the playback end track number Etno is equal to the last tack number Last. If it is, then the complete disk tracks have been played, so that the program is finished at $S_{90}$. If it is not, on the other hand, then there is still a track or tracks that are left unplayed. An incrementation of the playback end track number is substituted into the playback start track number Stno at Step $S_{89}$, and the program is restarted from $S_{81}$.

Digital Output:

Digital audio output from the CD player must customarily contain the following subcode data in addition to the main audio data:
1. The properties of the audio information such as preemphasis, copyright, and data properties.
2. Track numbers.
3. Index numbers.
4. Lapse of time on each track on the disk (in min., sec., and frame).
5. Absolute time on the disk (in amin., asec., and aframe).

If the expanded TOC has been edited by the user, the items 2-5 of the subcode data above must conform to the edited TOC rather than to the original TOC on the disk. As a result, in order for the disk player according to the invention to gain full utility, additional programs must be incorporated in it for providing the subcode data in compliance with the edited TOC.

Figure 31:
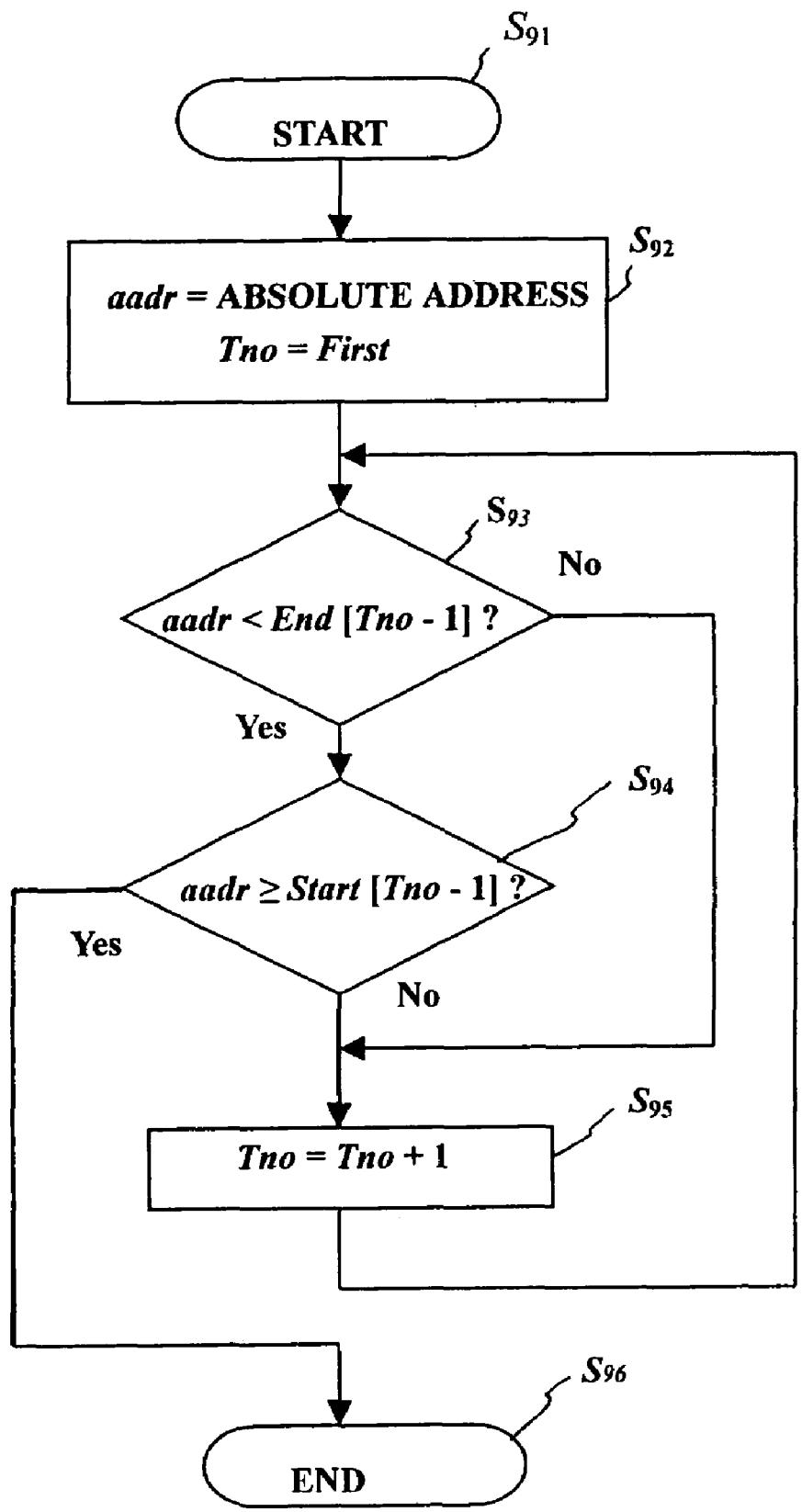
FIG. 31 is a flowchart of a program for finding current track numbers in providing a digital output during disk playback according to an edited TOC in the FIG. 1 disk player.

Flowcharted in FIG. 31 is one of such additional programs for finding the current track number from the edited TOC on the basis of the absolute address of the disk being played. Starting at $S_{91}$, the program dictates at Step $S_{92}$ the storage on the RAM 14 of the variable aadr representative of a current absolute address, together with the variable Tno representative of a track to be found. The initial value of the track number variable Tno is the starting track number First on the disk.

The following two Steps $S_{93}$ and $S_{94}$ are directed to the determination of which track the current absolute address aadr belongs to. To this end it is asked at Step $S_{93}$ whether the current absolute address aadr is less than the ending address of a given track number (in this case the starting track number) represented by the track number variable Tno, and at Step $S_{94}$ whether the current absolute address aadr is greater than the starting address of the given track number.

If the answer is "no" at Step $S_{93}$, the program jumps to Step $S_{95}$ where the track number variable Tno is incremented to see whether the current absolute address belongs to the next track that is listed on the edited TOC. If the answer is "yes" at both Steps $S_{93}$ and $S_{94}$, then $$\text{Start }[Tno-1] \leq aadr < End\,[Tno-1].$$

The track number variable Tno may now be fixed at that track number, and the program is finished at $S_{96}$.

Figure 32:
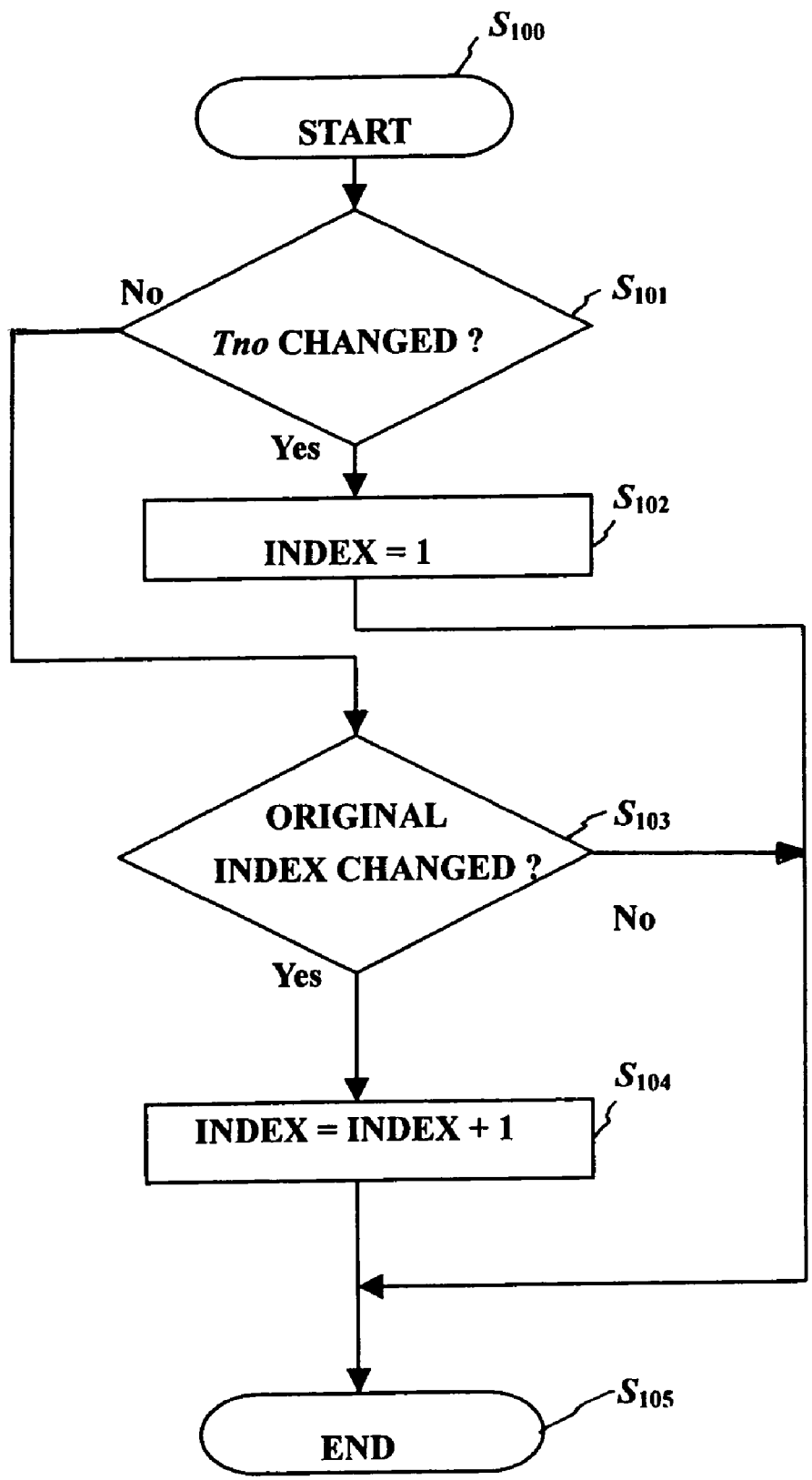
FIG. 32 is a flowchart of a program for incrementing the index number during disk playback in the FIG. 1 disk player.

FIG. 32 is a flowchart of a program for incrementing the index number during disk playback according to an edited TOC. Starting at $S_{100}$, the program ascertains at Step $S_{101}$ whether the track number being played has been renewed. If it has, the index number is initialized at "one" at the next Step $S_{102}$. If not, on the other hand, then the program jumps to Step $S_{103}$ where it is determined whether a change has occurred in the index information included in the subcode from the disk. The index number is incremented at Step S104 if the answer to the Step $S_{103}$ query is "yes".

Figure 33:
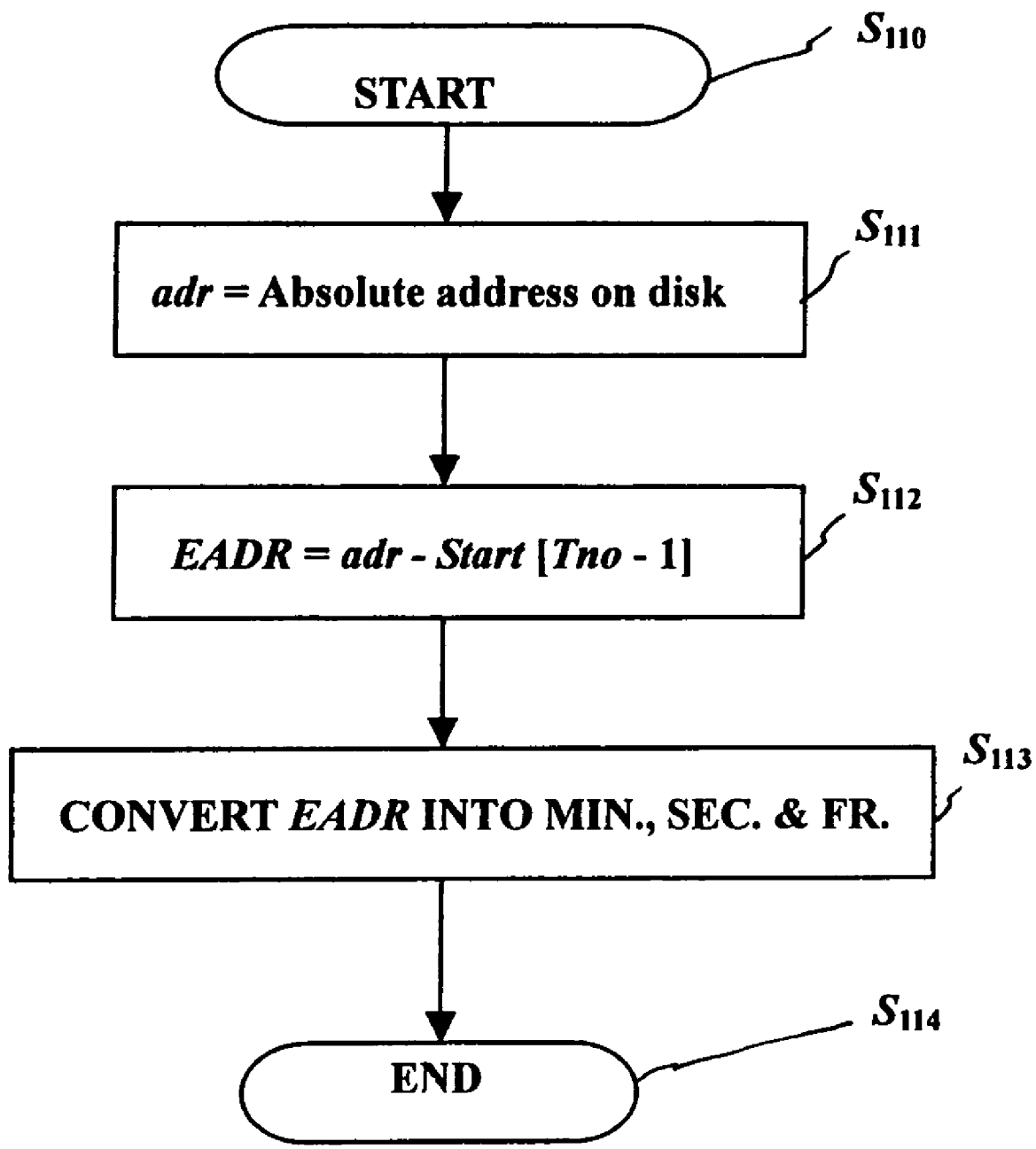
FIG. 33 is a flowchart of a program for computation of the lapse of time during the playback of a track in the FIG. 1 disk player.

FIG. 33 is a flowchart of a program for computation of the lapse of time during the playback of a track. Starting at $S_{110}$, the program dictates the storage of the absolute address on the disk being played, as the variable adr. Then at Step $S_{112}$ the relative address EADR on the particular track being played is computed by subtracting the starting address Start[Tno−1] of the track from the absolute address variable adr. Then at Step $S_{113}$ the lapse of time on the track is obtained by converting the relative address EADR into values in minutes, seconds and frames.

Figure 34:
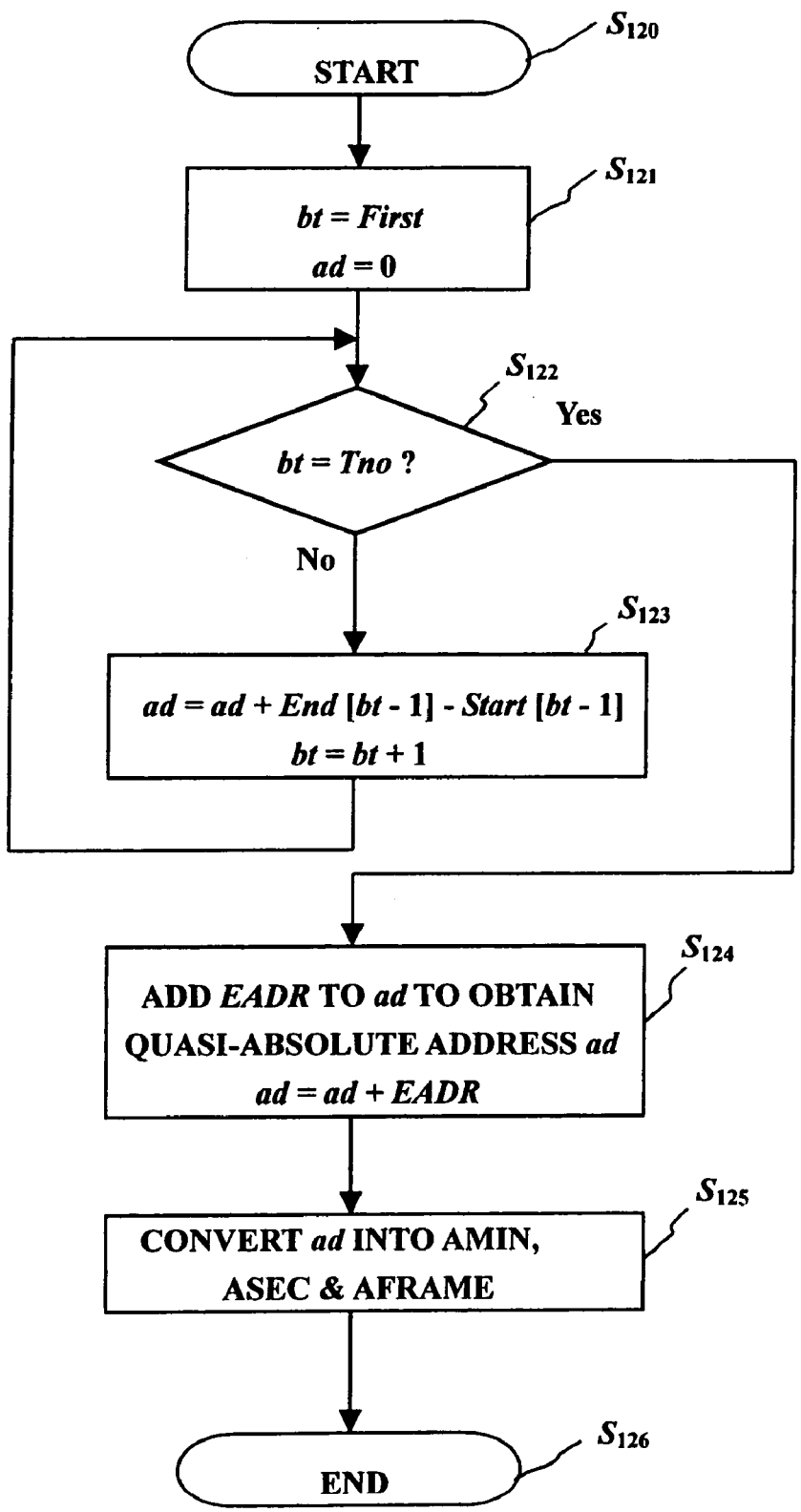
FIG. 34 is a flowchart of a program for computation of absolute time in the FIG. 1 disk player.

FIG. 34 is a flowchart of a program for computation of absolute time during disk playback according to an edited TOC. After a start at $S_{120}$, the address lengths are cumulatively added together in the order of the tracks on the edited TOC at Step $S_{123}$. Then at Step $S_{124}$ the quasi-absolute address ad is obtained by adding the relative address EADR on the track being played, computed as above in the program in FIG. 33, to the cumulation ad of the address lengths on the tracks before the one being now played. Then at Step $S_{125}$ the absolute time during disk playback according to an edited TOC is obtained by converting the quasi-absolute address ad into time.

Thus, even when the disk is played as programmed by the user with use of the expanded TOC, the disk player according to the invention can put out digital audio data together with the standard subcode data. Then the disk will be digitally rerecorded, as by a CD, MD or DAT recorder, and later played back, just as programmed by the user.

Effects of the Invention:

It is clear from the foregoing that the present invention imparts greater diversity to the programming of the prerecorded tunes on CDs or the like for playback or rerecording. While the TOCs on standard music CDs list only the starting addresses of the tracks, the present invention hereby proposes to translate such TOCs into the expanded TOCs listing not only the starting, but also ending, addresses of the tracks. The expanded TOC according to the invention enables the user to edit the prerecorded tunes in a more diversified manner than heretofore, dividing each track into parts and joining, skipping or moving such parts. As an additional advantage, such diversified editing requires no major alteration of the preexisting input and associated means for disk playback in conventional methods.

Possible Modifications:

The present invention is not to be limited by the details of the above described mode of carrying out the invention but admits of modifications such as the following:

1. The invention is applicable to the playback of other recording media such as CD-Rs and CD-RWs, in which case the expanded TOC, with or without editing, may be stored on the CD-R or CD-RW itself.
2. Instead of rewriting or moving the starting and ending addresses in the expanded TOC on the RAM, the track numbers could be rewritten or moved; in short, any method might be employed as long disk playback could be programmed by use of the expanded TOC.
3. The ending addresses on the expanded TOC could be ascertained by determining or detecting the end of each track from the absolute time in the program area of the disk or from the length of each tune, instead of by copying the starting address of the next track.

Industrial Applicability:

The data storage disk player according to the invention finds use as a CD or like disk player.

What is claimed:

1. An apparatus for playback of a data storage compact disk of the type having a series of data streams and a TOC prerecorded in preassigned tracks thereon, each data stream being comprised of a series of frames each having a data region for storage of data and an address region for storage of the address of the frame in question in the track in question, the TOC on the disk listing the starting addresses of the data streams but not listing the ending addresses of the data streams, characterized in that the playback apparatus comprises:

a transducer for reading the prerecorded data streams and TOC on the disk by relatively scanning the tracks thereon;

a RAM connected to said transducer for rewritably storing the TOC read on the disk by said transducer; and data processing means connected to said RAM and said transducer for creating an expanded TOC by adding an ending address of each data stream to the original TOC which has been stored on said RAM and for controlling the scanning motion of the transducer with respect to the disk according to the expanded TOC, the expanded TOC being editable for causing said data processing means to play either whole or some desired part of any desired one of the data streams, wherein said data processing means comprises input means for inputting instructions for editing the TOC that has been stored on said RAM, ending address addition means for adding to the original TOC that has been stored on said RAM, as the ending address of each data stream, the staffing address of the next data stream, editing means for editing the expanded TOC on said RAM in response to the instructions that have been input on said input means, and control means for causing the disk to be played according to the edited TOC on said RAM.

2. A playback apparatus as claimed in claim 1, characterized in that said ending address addition means, said editing means and said control means are comprised of:

a central processor unit connected to said input means; and a memory connected to said central processor unit and storing a program for creating the expanded TOC by adding the ending addresses and a program for editing the expanded TOC.

3. A playback apparatus as claimed in claim 1, characterized in that said data processing means comprises:

means for specifying any desired address intermediate the starting address and ending address of any desired one of the prerecorded data streams on the disk in order to divide the desired data stream into parts upstream and downstream, respectively, of the desired intermediate address; and means for introducing into the TOC on said RAM the desired intermediate address both as the ending address of the upstream division of the desired data stream and as the staffing address of the downstream division of the desired data stream, and for introducing into the TOC on said RAM the ending address of the desired data stream as the ending address of the downstream division of the desired data stream.

4. A playback apparatus as claimed in claim 1, characterized in that said data processing means comprises, in order to enable the user to sequentially play back a plurality of selected ones of the prerecorded data streams on the disk, means for storing on the TOC on said RAM the starting address of the most upstream one of the selected data streams as the staffing address of the selected series of data streams, and for storing on the TOC on said RAM the ending address of the most downstream one of the selected data streams as the ending stream of the selected series of data streams.

5. A playback apparatus as claimed in claim 1, characterized in that said data processing means comprises, in order to inhibit the playback of any selected one of the prerecorded data streams on the disk, means for erasing from the TOC the starting and ending addresses of the selected data stream.

6. A playback apparatus as claimed in claim 1, characterized in that said data processing means comprises, in order to inhibit the playback of part of any selected one of the prerecorded data streams on the disk, means for changing at least either of the staffing and ending addresses of the selected data stream on the TOC on said RAM.

7. A playback apparatus as claimed in claim 1, characterized in that said data processing means comprises, in order to enable the sequential playback of any selected first one of the prerecorded data streams on the disk and a second one that is immediately downstream of the first selected data stream, with a change in the point of transition between the two:

means for specifying a desired address intermediate the starting and ending addresses of the second data stream; and means for storing the desired intermediate address on the TOC on said RAM as the ending address of the first selected data stream and as the staffing address of the second data stream.

8. A playback apparatus as claimed in claim 1, characterized in that said data processing means comprises, in order to enable the sequential playback of any selected first one of the prerecorded data streams on the disk and a second one that is immediately downstream of the first selected data stream, with a change in the point of transition between the two:

means for specifying a desired address intermediate the starting and ending addresses of the first data stream; and means for storing the desired intermediate address on the TOC on said RAM as the ending address of the first selected data stream and as the staffing address of the second data stream.

9. A playback apparatus as claimed in claim 1, characterized in that said data processing means comprises, in order to enable the sequential playback of any selected two of the prerecorded data streams on the disk, with a change in the sequence of playback, means for storing, as the starting and ending addresses of a first selected data stream, the starting and ending addresses of a second selected data stream on the TOC on said RAM, and, as the staffing and ending addresses of said second selected data stream, the starting and ending addresses of said first selected data stream on the TOC on said RAM.

10. A playback apparatus as claimed in claim 1, characterized in that said starting and ending addresses are the absolute addresses on the CD.

\* \* \* \* \*